US012691594B2

(12) United States Patent
Chen et al.

(10) Patent No.: US 12,691,594 B2
(45) Date of Patent: Jul. 28, 2026

(54) MODULAR GRIPPER

(71) Applicant: Delta Electronics, Inc., Taoyuan City (TW)

(72) Inventors: Hsin-Hua Chen, Taoyuan City (TW); Tsao-Hsiang Wang, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 559 days.

(21) Appl. No.: 18/238,378

(22) Filed: Aug. 25, 2023

(65) Prior Publication Data

US 2024/0359341 A1 Oct. 31, 2024

(30) Foreign Application Priority Data

Apr. 28, 2023 (CN) .......................... 202310482939.5

(51) Int. Cl.
 *B25J 15/04* (2006.01)
 *B25J 15/02* (2006.01)
(52) U.S. Cl.
 CPC ........... *B25J 15/045* (2013.01); *B25J 15/026* (2013.01)
(58) Field of Classification Search
 None
 See application file for complete search history.

(56) References Cited

U.S. PATENT DOCUMENTS

| | | | | |
|---|---|---|---|---|
| 2,564,138 | A | * | 8/1951 | Walker ...................... B25B 1/24 |
| | | | | 269/95 |
| 5,242,159 | A | | 9/1993 | Bernstein |
| 5,657,973 | A | * | 8/1997 | Zajac, Jr. ............. B25J 15/0253 |
| | | | | 269/34 |
| 5,720,476 | A | * | 2/1998 | Swann .................. B25B 1/2405 |
| | | | | 269/244 |
| 8,939,442 | B2 | * | 1/2015 | Wang ........................ B25B 1/18 |
| | | | | 269/242 |
| 11,219,983 | B2 | * | 1/2022 | Tseng ........................ B25B 5/02 |
| 11,383,354 | B1 | * | 7/2022 | Taylor ................... B25B 1/2478 |

(Continued)

FOREIGN PATENT DOCUMENTS

| | | |
|---|---|---|
| CN | 204022086 U | 12/2014 |
| CN | 103338902 B | 8/2016 |

(Continued)

*Primary Examiner* — William A. Rivera
(74) *Attorney, Agent, or Firm* — KIRTON McCONKIE; Evan R. Witt

(57) ABSTRACT

A modular gripper is disclosed and includes a main fixing plate, a driving module, two screw rods, two extension plates, two extension screws and two nuts. The two screw rods are arranged concentrically in the first direction, connected to the driving module, and driven by the driving module to rotate. The two extension plates are detachably docked to two sides of the main fixing plate through connection elements. The two extension screws are connected to the two screw rods, respectively. Threads of the two extension screws are continuously connected with threads of the two screw rods. The two nuts are sleeved on the two screw rods, respectively. When the two screw rods and the two extension screws are driven by the driving module to rotate synchronously, the two nuts are allowed to displace relative to the two screw rods and the two extension screws, to achieve a clamping operation.

19 Claims, 25 Drawing Sheets

(56) References Cited

U.S. PATENT DOCUMENTS

| 2023/0075011 A1* | 3/2023 | Kim ..................... B25J 15/0253 |
| 2024/0359340 A1* | 10/2024 | Chen ..................... B25J 15/026 |
| 2024/0383155 A1* | 11/2024 | Geary ..................... H02P 8/14 |

FOREIGN PATENT DOCUMENTS

| CN | 106239545 | * | 7/2018 |
| CN | 110271029 | * | 9/2019 |
| CN | 209614912 U | | 11/2019 |
| CN | 112171710 A | | 1/2021 |
| CN | 215749247 U | | 2/2022 |
| CN | 216000553 U | | 3/2022 |
| CN | 216265375 U | | 4/2022 |
| CN | 218659122 U | | 3/2023 |
| CN | 218659148 U | | 3/2023 |
| CN | 116619433 | * | 8/2023 |
| TW | 201422394 A | | 6/2014 |
| TW | I692388 B | | 5/2020 |
| WO | WO 2023062076 | * | 4/2023 |

* cited by examiner

MODULAR GRIPPER

CROSS-REFERENCE TO RELATED APPLICATION

This application claims priority to China Patent Application No. 202310482939.5, filed on Apr. 28, 2023. The entire contents of the above-mentioned patent application are incorporated herein by reference for all purposes.

FIELD OF THE INVENTION

The present disclosure relates to a gripper structure, and more particularly to a modular gripper having screw rods, linear rails and fixing plates in modular design, and capable of adjusting the length and the working stroke according to the requirements without redesigning the screw rods and the fixing plates.

BACKGROUND OF THE INVENTION

A robotic arm is an automatic control device having the function of imitating a human arm and capable of completing various tasks, and has been widely used in the automated mechanical device. In addition to being mainly used in industrial manufacturing, the applications of the robotic arm are found in the fields of the commercial agriculture, the medical rescue, the entertainment service and the military security. The structure of the robotic arm includes a mechanical main body, a controller, a servo mechanism and a sensor, and a certain designated action of the robotic arm is set by the program according to the operation requirement. The device installed at the end of the robotic arm for gripping an object directly is usually called as a gripper, an end effector or a robot hand. Its purpose is to replace the human fingers, skillfully complete many complex tasks or manipulate various objects. However, for different working tasks, different driving methods are often selected to construct the gripper structure.

Take the common long-stroke gripper structure on the market as an example. The gripper structure includes a left-handed screw rod and a right-handed screw rod, and the belt pulleys are added to the left-handed screw rod and the right-handed screw rod, respectively. When the motors are rotated to drive the belts, the belts further drive the screw rods to rotate. By the rotation of the screw rods arranged on both sides, the nuts drive the clamping bases on both sides to move, thereby achieving the clamping operation. However, the movement of the clamping base is limited by the length of respective screw rod, so that the clamping operation of the gripper can only be carried out within a fixed stroke range. Once the user needs to perform a larger range of stroke operations through the gripper, the fixing plates and the screw rods on both sides of the gripper need to be redesigned. It is not possible to change the length directly.

Therefore, there is a need of providing a modular gripper having screw rods, linear rails and fixing plates in modular design, and capable of adjusting the length and the working stroke according to the requirements without redesigning the screw rods and the fixing plates, so as to obviate the drawbacks encountered by the prior arts.

SUMMARY OF THE INVENTION

An object of the present disclosure is to provide a modular gripper having screw rods, linear rails and fixing plates in modular design, capable of adjusting the length and the working stroke according to the requirements without redesigning the screw rods and the fixing plates.

Another object of the present disclosure is to provide a modular gripper. The two opposite ends of the main fixing plate are extended in length through the extension plates. Preferably, the main fixing plate and the extension plates are docked in a parallel fastening method to avoid the vertical stacking and fastening, so that the thickness of the entire plate is not increased. In addition, the two screw rods of the left-handed screw rod and the right-handed screw rod can increase the length through the extension screws. Preferably, the connection between the screw rod and the extension screw adopts a concentric connection along the axial direction, and the threads of each other are continuous. Since the left-handed screw rod and right-handed screw rod are connected to the motor of the drive module through the pulleys in a concentric mounting configuration. When the motor rotates the pulley through the belt, the left-handed screw rod and the right-handed screw rod are driven to rotate simultaneously. In addition, the corresponding nut is allowed to displace within the range of the screw rod and the extension screw. Furthermore, the nuts sleeved on the left-handed screw rod and the right-handed screw rod are connected to the linear rails through the sliding block as an adapter plate, so that the clamping element is smoothly moved left and right synchronously with the nut to achieve the long-stroke clamping operation.

A further object of the present disclosure is to provide a modular gripper. Since the screw rods, the extension plates, the extension screws, the nuts, the linear rails and the extension rails are designed with bilateral symmetry, it is conducive to the realization of modularization, and easy to disassemble and adjust to achieve the clamping operation in different strokes. When the stroke length of the gripper needs to be increased, the extension screws, the extension plates and the extension rails are added on both sides to increase the stroke length. There is no need to redesign the gripper structure. It helpful of increasing the diversity of product applications.

In accordance with an aspect of the present disclosure, a modular gripper is provided and includes a main fixing plate, a first extension plate, a second extension plate, a driving module, a first screw rod, a second screw rod, a first extension screw, a second extension screw, a first nut and a second nut. The main fixing plate have two docking ends opposite to each other in a first direction. The first extension plate and a second extension plate are bilaterally symmetrical to each other and detachably docked to the two docking ends of the main fixing plate through a first connection component and a second connection component, respectively, in the first direction. The driving module is disposed on the main fixing plate. The first screw rod and the second screw rod are bilaterally symmetrical to each other, disposed on the main fixing plate and arranged concentrically in the first direction, wherein the first screw rod includes a first driving end and a first extension end, the second screw rod includes a second driving end and a second extension end, and the first driving end and the second driving end face each other in the first direction and are connected to the driving module, wherein the first extension end and the second extension end are disposed opposite to each other in the first direction. The first extension screw and the second extension screw are bilaterally symmetrical to each other, wherein the first extension screw is detachably connected to the first extension end, and a thread of the first extension screw is continuously connected with a thread of the first screw rod, wherein the second extension screw is detachably connected to the second extension end, and a thread of the second extension screw is continuously connected with a thread of the second screw rod. The first nut and the second nut are bilaterally symmetrical to each other, and sleeved and matched to the first screw rod and the second screw rod respectively, wherein when the first screw rod and the first extension screw are driven by the driving module to rotate synchronously, the first nut is allowed to displace relative to the first screw rod and the first extension screw in the first direction, wherein when the second screw rod and the second extension screw are driven by the driving module to rotate synchronously, the second nut is allowed to displace relative to the second screw rod and the second extension screw in the first direction, thereby the first nut and the second nut are close to or far away from each other to achieve a clamping operation.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
FIG. 1 is a perspective structural view illustrating a modular gripper according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "front," "rear," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

Figure 2:
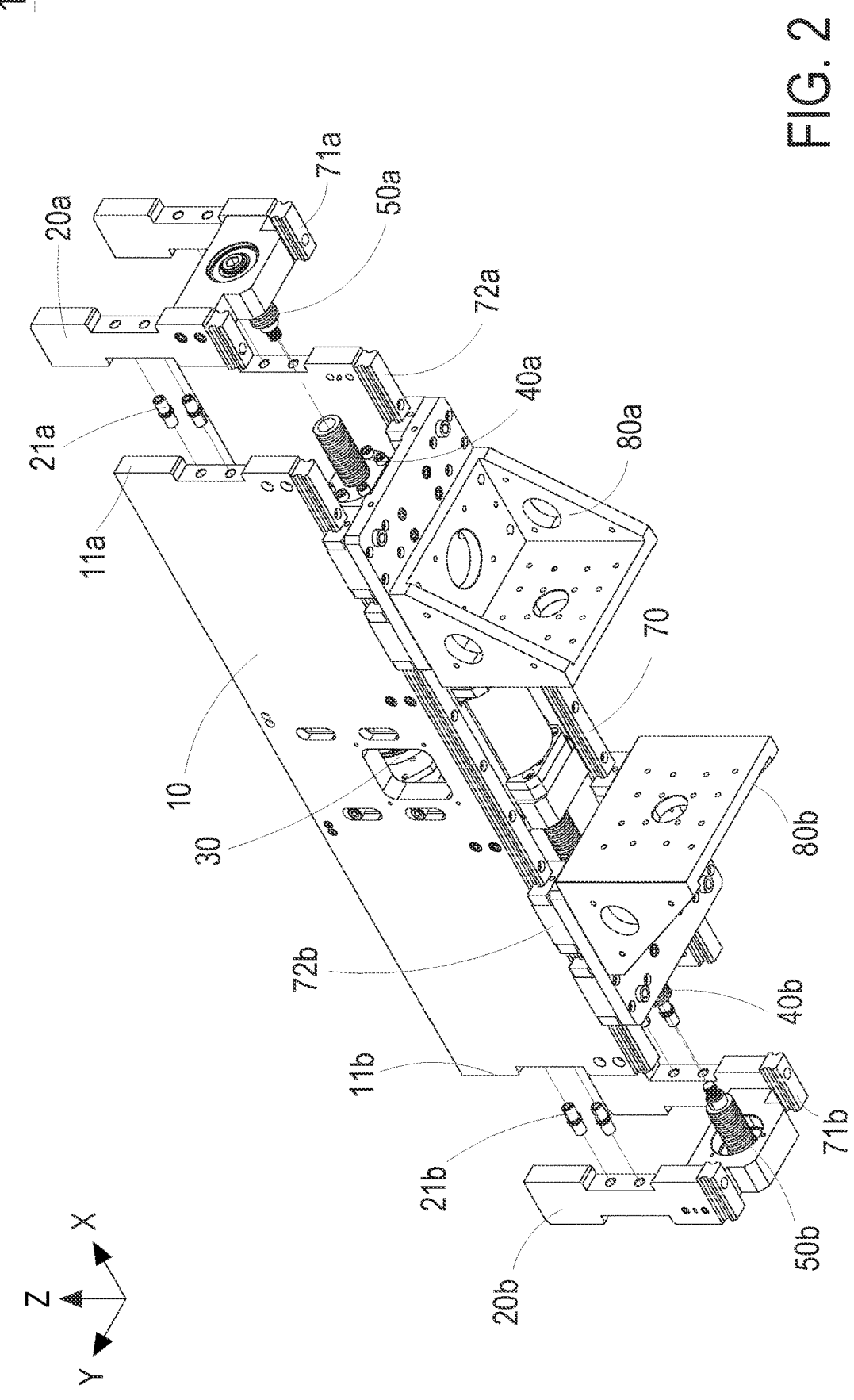
FIG. 2 is an exploded view illustrating the modular gripper according to the embodiment of the present disclosure.
Figure 3:
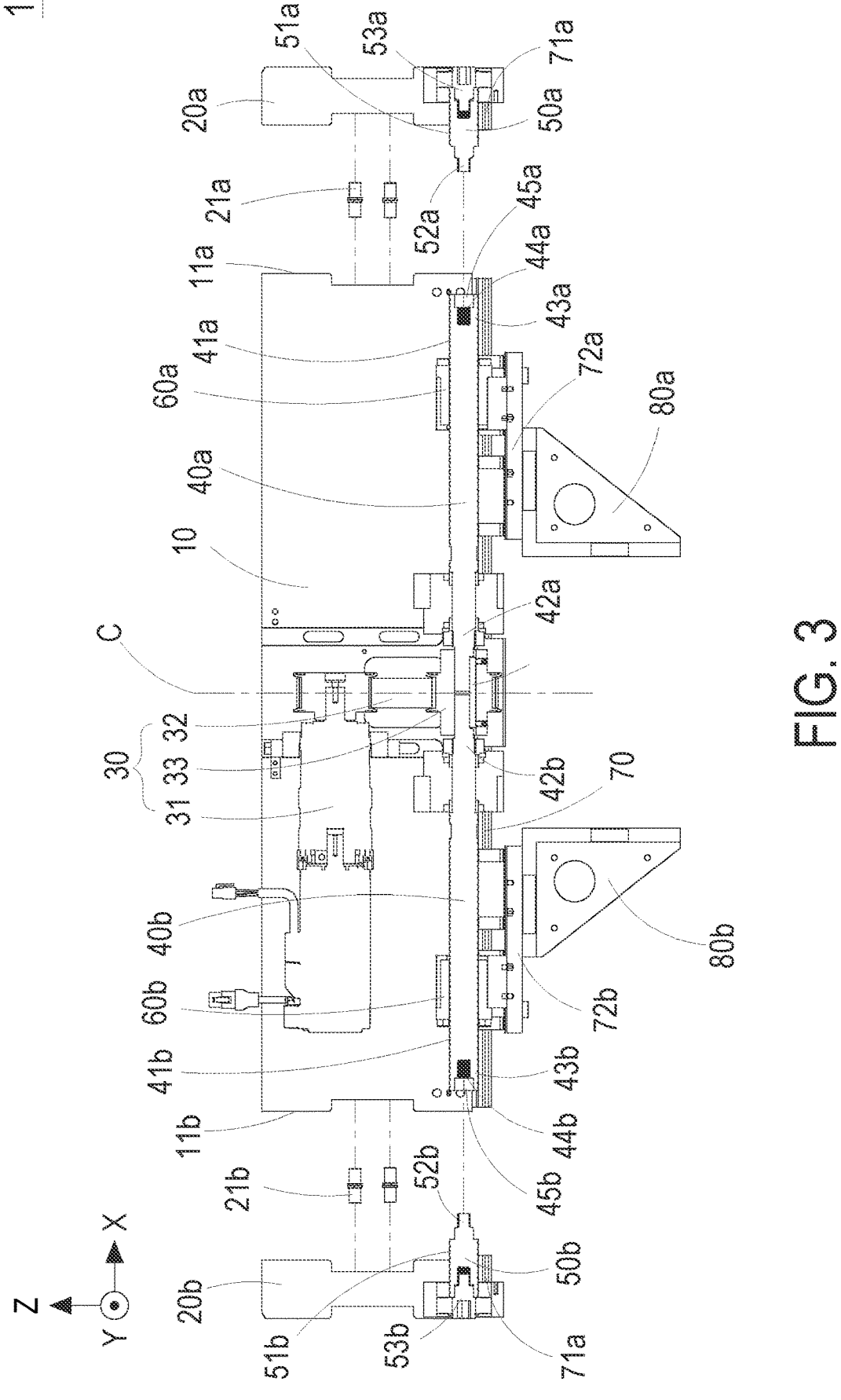
FIG. 3 is a cross-sectional view illustrating the modular gripper according to the embodiment of the present disclosure.
Figure 4:
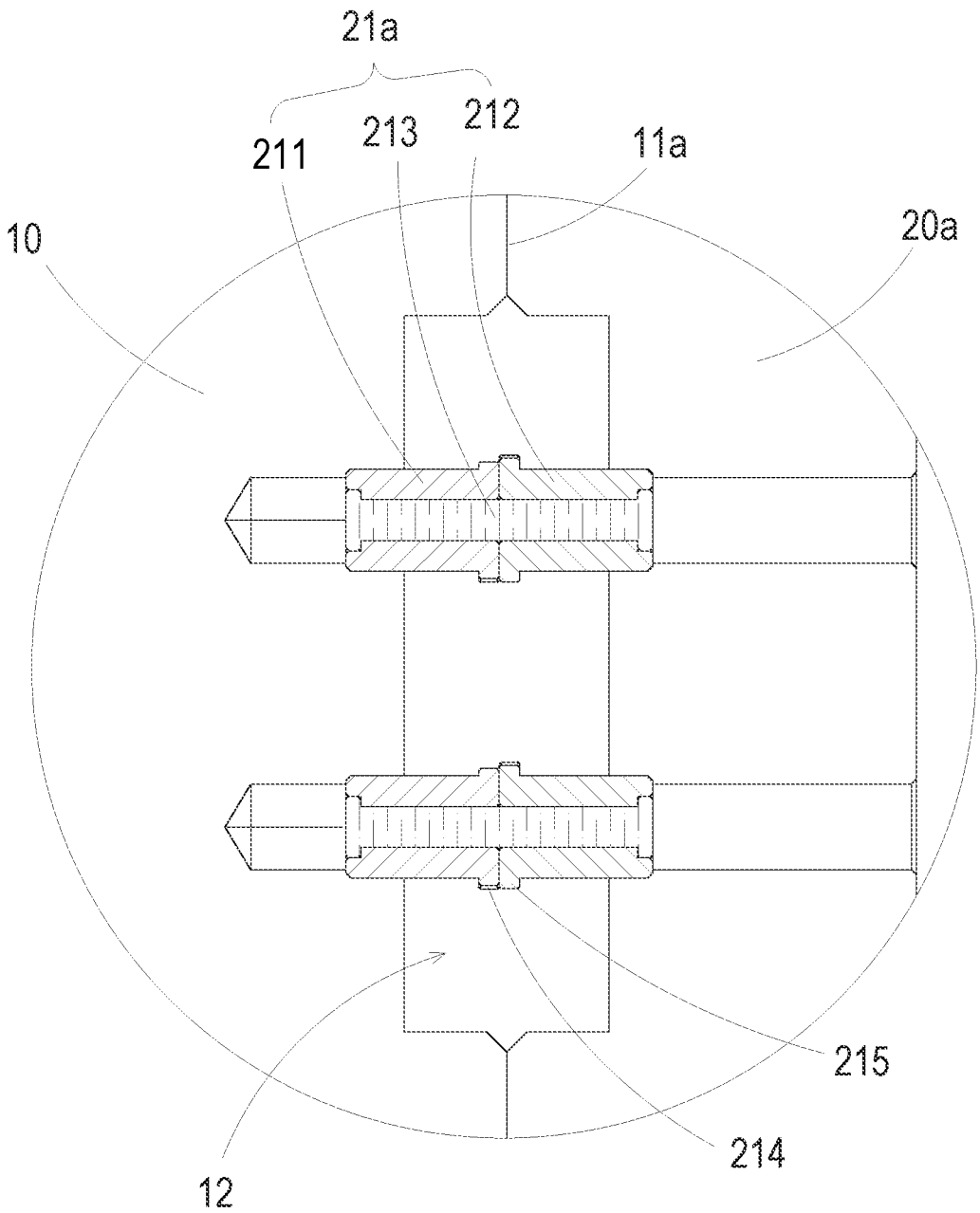
FIG. 4 is a schematic diagram showing that the extension plate is connected to the main fixing plate through the connection component.
Figure 5A:
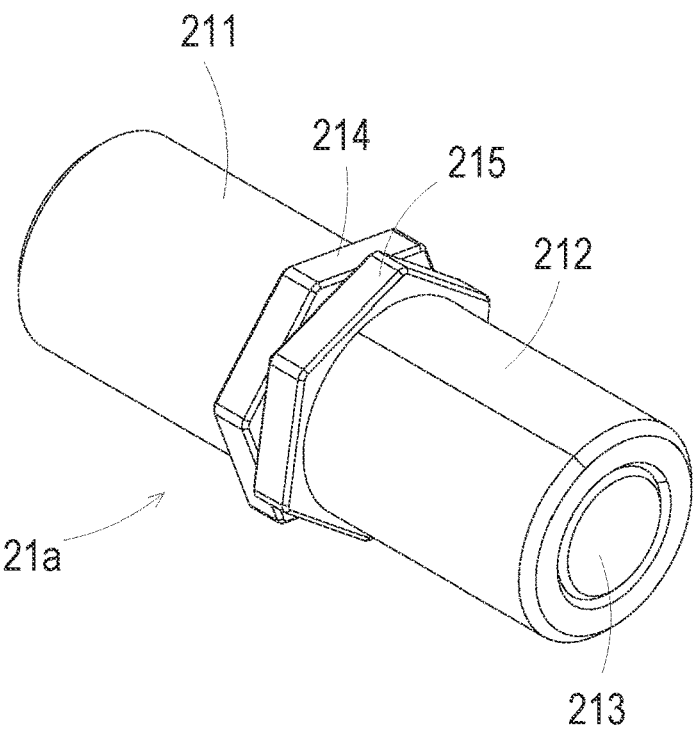
FIG. 5A is a perspective structural view illustrating the connection component.
Figure 5B:
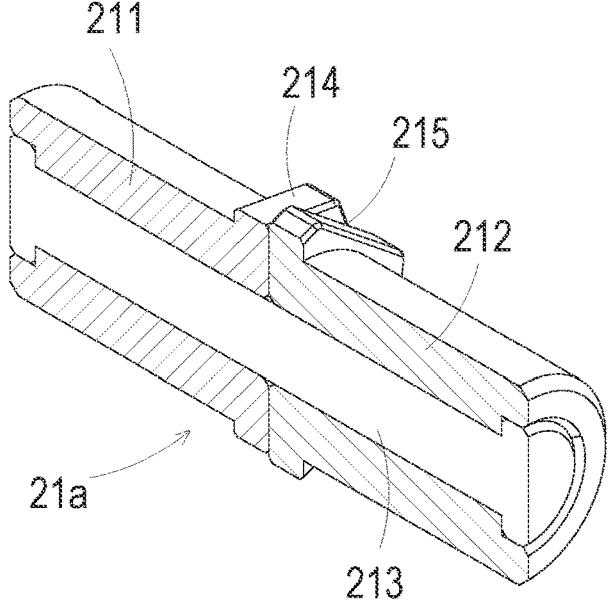
FIG. 5B is a cross-sectional structural view illustrating the connection component.
Figure 6A:
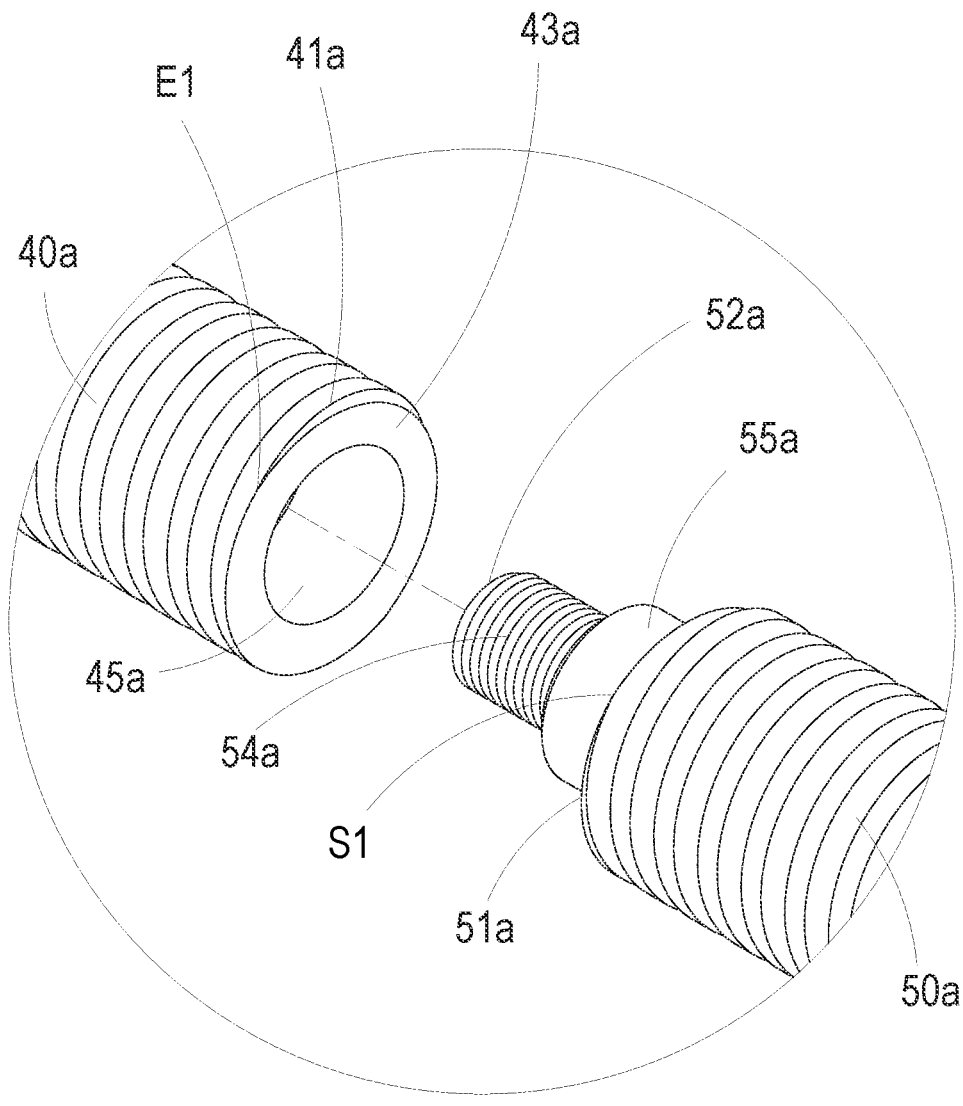
FIGS. 6A and 6B are schematic diagrams showing that the screw rod and the extension screw are disassembled apart from each other.
Figure 6B:
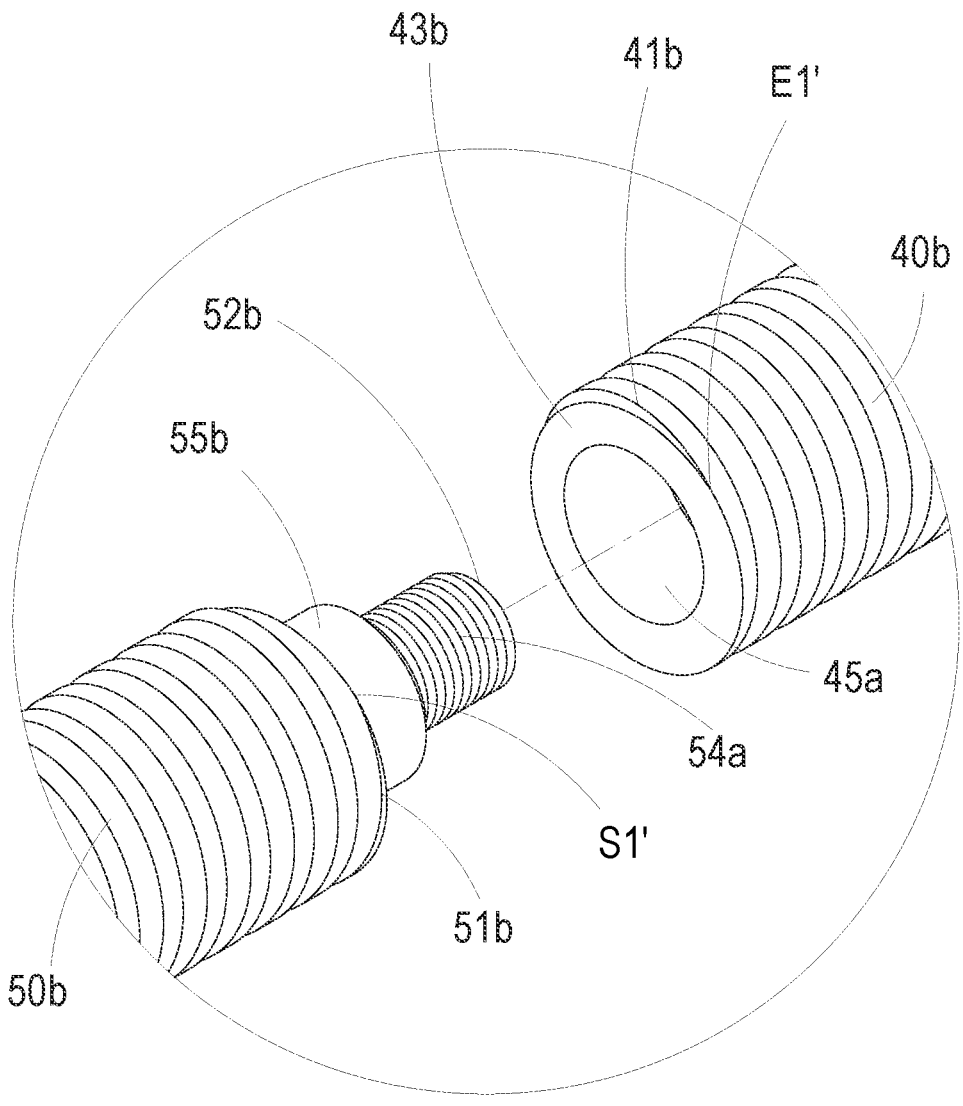

Please refer to FIG. 1 to FIG. 3. The present disclosure provides a modular gripper 1 including a main fixing plate 10, a first extension plate 20*a*, a second extension plate 20*b*, a driving module 30, a first screw rod 40*a*, a second screw rod 40*b*, a first extension screw 50*a*, a second extension screw 50*b*, a first nut 60*a* and a second nut 60*b*. Preferably but not exclusively, two parallel main fixing plates 10 front and rear are spliced together to form a fixing frame, or one single main fixing plate 10 is served as a fixing frame. In the following descriptions of the embodiments, one single main fixing plate 10 is used for illustration, and the present disclosure is not limited thereto. Preferably but not exclusively, the main fixing plate 10 are bilaterally symmetrical with respect to the midline C. The main fixing plate 10 have two docking ends 11*a*, 11*b* opposite to each other in a first direction, such as the X axial direction. The first extension plate 20*a* and a second extension plate 20*b* are bilaterally symmetrical to each other and detachably docked to the two docking ends 11*a*, 11*b* of the main fixing plate 10 through a first connection component 21*a* and a second connection component 21*b*, respectively, in the first direction (i.e., the X axial direction). The first extension plate 20*a* is detachably connected to the right docking end 11*a* of the main fixing plate 10 through the first connection component 21*a* from the right side of the midline C; the second extension plate 20*b* is detachably connected to the left docking end 11*b* of the main fixing plate 10 through the second connection component 21*b* from the left side of the midline C. The driving module 30 is disposed on the main fixing plate 10. Preferably but not exclusively, the driving module 30 is accommodated between the two main fixing plates 10. The present disclosure is not limited thereto. The first screw rod 40*a* and the second screw rod 40*b* are bilaterally symmetrical to each other, disposed on the main fixing plate 10 and arranged concentrically in the first direction (i.e., the X axial direction). In the embodiment, the first screw rod 40*a* on the right side includes a first driving end 42*a* and a first extension end 43*a*, and the second screw rod 40*b* on the left side includes a second driving end 42*b* and a second extension end 43*b*. The first driving end 42*a* and the second driving end 42*b* face each other in the first direction. Preferably but not exclusively, the first driving end 42*a* and the second driving end 42*b* are disposed adjacent to the midline C and connected to the driving module 30. In addition, the first extension end 43*a* and the second extension end 43*b* are disposed opposite to each other in the first direction, and spatially corresponding to the right docking end 11*a* and the left docking end 11*b* of the main fixing plate 10, respectively. In the embodiment, the first extension screw 50*a* and the second extension screw 50*b* are bilaterally symmetrical to each other. The first extension screw 50*a* is detachably connected to the first extension end 43*a* of the first screw rod 40*a*, and a thread of the first extension screw 50*a* is continuously connected with a thread of the first screw rod 40*a*. The second extension screw 50*b* is detachably connected to the second extension end 43*b* of the second screw rod 40*b*, and a thread of the second extension screw 50*b* is continuously connected with a thread of the second screw rod 40*b*. The first nut 60*a* and the second nut 60*b* are standard nuts, bilaterally symmetrical to each other, and sleeved and matched to the first screw rod 40*a* and the second screw rod 40*b* respectively. When the first screw rod 40*a* and the first extension screw 50*a* on the right side are driven by the driving module 30 to rotate synchronously, the first nut 60*a* is allowed to displace relative to the first screw rod 40*a* and the first extension screw 50*a* in the first direction. Moreover, when the second screw rod 40*b* and the second extension screw 50*b* are driven by the driving module 30 to rotate synchronously, the second nut 60*b* is allowed to displace relative to the second screw rod 40*b* and the second extension screw 50*b* in the first direction, thereby the first nut 60*a* and the second nut 60*b* are close to or far away from each other to achieve a clamping operation.

In the embodiment, the first driving module 30 includes a motor (with deceleration mechanism) 31, a belt 32 and a pulley 33. Preferably but not exclusively, the pulley 33 is disposed at the midline C and connected to the first driving end 42*a* of the first screw rod 40*a* on the right side and the second driving end 42*b* of the second screw rod 40*b* on the left side. The motor 31 is disposed on the main fixing plate 10 and connected to the pulley 33 through the belt 32 for driving the pulley 33, so that the first screw rod 40*a* and the second screw rod 40*b* are driven to rotate concentrically. In the embodiment, the first screw rod 40*a* has a first main external thread 41*a*, and the second screw rod 40*b* has a second main external thread 41*b*. Preferably but not exclusively, the first main external thread 41*a* and the second main external thread 41*b* are the right-hand thread and the left-hand thread, respectively, which are reverse to each other. When the driving module 30 drives the first screw rod 40*a* and the second screw rod 40*b* to rotate concentrically, the first nut 60*a* is acted by the first main external thread 41*a* of the first screw rod 40*a*, and the second nut 60*b* is acted by the second main external thread 41*b* of the second screw rod 40*b*. In that, the first nut 60*a* and the second nut 60*b* are driven to approach the midline C or move away from the midline C synchronously, so as to achieve the clamping operation. Similarly, in the embodiment, the first extension screw 50*a* has a first extension external thread 51*a*, and the second extension screw 50*b* has a second extension external thread 51*b*. Preferably but not exclusively, the first extension external thread 51*a* and the second extension external thread 51*b* are the right-hand thread continuously connected to the first main external thread 41*a* and the left-hand thread continuously connected to the second main external thread 41*b*, respectively, which are reverse to each other. When the modular gripper 1 performs the clamping operation, the first nut 60*a* and the second nut 60*b* are displaced symmetrically relative to the first screw rod 40*a* and the first extension screw 50*a* on the right side of the midline C and the second screw rod 40*b* and the second extension screw 50*b* on the left side of the midline C, respectively.

In the embodiment, the modular gripper 1 further includes a linear rail 70, a first extension rail 71*a*, a second extension rail 71*b*, a first sliding block 72*a* and a second sliding block 72*b*. Preferably but not exclusively, the linear rail 70 includes two front and rear rails 70, and each of them can be used alone. In the following descriptions of the embodiments, one single linear rail 70 is used for illustration, and the present disclosure is not limited thereto. In the embodiment, the linear rail 70 is disposed on the main fixing plate 10 along the first direction (i.e., the X axial direction) and spatially corresponding to the first screw rod 40*a* and the second screw rod 40*b*. The first extension rail 71*a* and the second extension rail 71*b* are bilaterally symmetrical to each other, disposed on the first extension plate 20*a* and the second extension plate 20*b*, respectively, and connected to two opposite ends of the linear rail 70, so as to be arranged in a line along the first direction. In the embodiment, the first sliding block 72*a* and the second sliding block 72*b* are arranged across the paired linear rails 70, respectively. The first sliding block 72*a* is connected to the first nut 60*a*, and the first sliding block 72*a* and the first nut 60*a* are allowed to synchronously displace relative to the linear rail 70 and the first extension rail 71*a* in the first direction. In addition, the second sliding block 72*b* is connected to the second nut 60*b*, and the second sliding block 72*b* and the second nut 60*b* are allowed to synchronously displace relative to the linear rail 70 and the second extension rail 71*b* in the first direction.

In the embodiment, the modular gripper 1 further includes a first clamping element 80*a* and a second clamping element 80*b* fixed to the first sliding block 72*a* and the second sliding block 72*b*, respectively. When the driving module 30 drives the first screw rod 40*a* and the first extension screw 50*a* on the right side and the second crew rod 40*b* and the second extension screw 50*b* on the left side to rotate, the first nut 60*a*, the first sliding block 72*a* and the first clamping element 80a are driven to approach or move away from the second nut 60b, the second sliding block 72b and the second clamping element 80b to achieve the clamping operation.

Notably, in the embodiment, the first screw rod 40a and the second screw rod 40b are extended in the first direction by combining the first extension screw 50a and the second extension screw 50b. Moreover, the linear rail 70 is extended in the first direction by combing the first extending rail 71a and the second extending rail 71b. Similarly, the main fixing plate 10 is extended in the first direction by combining the first extension plate 20a and the second extension plate 20b. The first extension screw 50a and the second extension screw 50b, the first extension rail 71a and the second extension rail 71b, and the first extension plate 20a and the second extension plate 20b can be replaced according to the practical requirements, thereby adjusting the stroke length of the modular gripper 1. In other words, the modular gripper 1 of the present disclosure adopts a modular design, the stroke length and the working are adjustable according to the practical requirements, and there is no need to redesign the screw rod and the fixing plate.

In the embodiment, the first extension plate 20a is detachable docked to the right docking end 11a of the main fixing plate 10 through a first connection component 21a in the first direction (i.e., the X axial direction). Moreover, the second extension plate 20b is detachable docked to the left docking end 11b of the main fixing plate 10 through a second connection component 21b in the first direction (i.e., the X axial direction). Preferably but not exclusively, the first connection component 21a and the second connection component 21b do not exceed an overlapping range of the first extension plate 20a, the main fixing plate 10 and the second extension plate 20b along the first direction in a viewing direction of the first direction (i.e., the X axial direction). In this way, the first extension plate 20a, the main fixing plate 10 and the second extension plate 20b are fixed in a serial connection manner, the vertical stacking and fastening in the Y axial direction or the Z axial direction is avoided, and the overall plate thickness is not increased. Preferably but not exclusively, the structural supports for the first extension screw 50a, the second extension screw 50b, the first extension rail 71a and the second extension rail 71b are provided by the first extension plate 20a and the second extension plate 20b.

Please refer to FIG. 1 to FIG. 4, FIG. 5A and FIG. 5B. In the embodiment, the first connection component 21a connected between the main fixing plate 10 and the first extension plate 20a, and the second connection component 21b connected between the main fixing plate 10 and the second extension plate 20b have the same structure. However, only the first connection 21a connected between the first fixing plate 10 and the first extension plate 20a is used for illustration. In the embodiment, the numbers of the first connection component 21a and the second connection component 21b are adjustable according to the practical requirements. Each of the first connection component 21a and the second connection component 21b includes a first fastening element 211, a second fastening element 212 and a restricting element 213. Preferably but not exclusively, the first fastening element 211 and the second fastening element 212 are two screws arranged concentrically. An operation end 214 of the first fastening element 211 and an operation end 215 of the second fastening element 212 face each other, and the restricting element 213 is disposed between the first fastening element 211 and the second element 212 and configured to restrict an axial direction between the first fastening element 211 and the second fastening element 212.

In that, it allows to drive the first fastening element 211 and the second fastening element 212 to rotate around the axis, but the detachment of the first fastening element 211 and the second fastening element 212 is avoided. In the embodiment, when the first extension plate 20a is docked with the main fixing plate 10 or the second extension plate 20b is docked with the main fixing plate 10, a window 12 is formed therebetween. Preferably but not exclusively, the operation end 214 of the first fastening element 211 and the operation end 215 of the second fastening element 212 are exposed through the window 12. In that, it allows the user to operate the first fastening element 211 and the second fastening element 212 through the window 12 to achieve the connection of the main fixing plate 10, the first extension plate 20a and the second extension plate 20b. In the embodiment, the first fastening element 211 and the second fastening element 212 are two screws with the same thread-rotation direction or two screws with reverse thread-rotation directions. Certainly, in other embodiments, the main fixing plate 10, the first extension plate 20a and the second extension plate 20b are fastened in serial connection through other splicing connectors. The present disclosure is not limited thereto and not redundantly described herein.

Please refer to FIG. 1 to FIG. 4, FIG. 6A, FIG. 6B, FIG. 7B and FIG. 7B. In the embodiment, the first extension screw 50a is disposed on the first extension plate 20a. The first extension screw 50a is detachably connected to the first extension end 43a of the first screw rod 40a. The first extension screw 50a and the first screw rod 40a are arranged concentrically in the first direction (i.e., the X axial direction). In the embodiment, the first screw rod 40a includes a first main external thread 41a, the first extension screw 50a includes a first extension external thread 51a. Preferably but not exclusively, the first main external thread 41a has an ending point E1 continuously connected with a starting point S1 of the first extension external thread 51a. Moreover, in the embodiment, the second extension screw 50b is disposed on the second extension plate 20b. The second extension screw 50b is detachably connected to the second extension end 43b of the second screw rod 40b. The second extension screw 50b and the second screw rod 40b are arranged concentrically in the first direction (i.e., the X axial direction). In the embodiment, the second screw rod 40b includes a second main external thread 41b, the second extension screw 50b includes a second extension external thread 51b. Preferably but not exclusively, the second main external thread 41b has an ending point E1' continuously connected with a starting point S1' of the second extension external thread 51b.

Please refer to FIG. 1 to FIG. 11B. In the embodiment, the first extension screw 50a includes a first docking portion 52a and a first supporting portion 53a disposed on two opposite ends. The first docking portion 52a is detachably connected to the first extension end 43a of the first screw rod 40a, so that the ending point E1 of the first main external thread 41a is continuously connected with the starting point S1 of the first extension external thread 51a. Another end of the first extension screw 50a is pivotally connected to the first extension plate 20a through the first supporting portion 53a to provide the support. Moreover, in the embodiment, the second extension screw 50b includes a second docking portion 52b and a second supporting portion 53b disposed on two opposite ends. The second docking portion 52b is detachably connected to the second extension end 43b of the second screw rod 40b, so that the ending point E1' of the second main external thread 41b is continuously connected with the starting point S1' of the second extension external thread 51*b*. Another end of the second extension screw 50*b* is pivotally connected to the second extension plate 20*b* through the second supporting portion 53*b* to provide the support. In the embodiment, a first front docking screw hole 44*a*, a first docking external thread 54*a*, a second front docking screw hole 44*b* and a second docking external thread 54*b* have an identical thread pitch D. The first docking portion 52*a* and the second docking portion 52*b* have a docking length L1, respectively. Preferably but not exclusively, the docking length L1 is N times the thread pitch D, N is an integer, and N≥1. In the embodiment, the starting point S1 of the first extension external thread 51*a* has a first extension-thread leading angle A1. The first screw rod 40*a* includes a first front docking screw hole 44*a* disposed on the first extension end 43*a*, and the first docking portion 52*a* includes a first docking external thread 54*a* corresponding to the first front docking screw hole 44*a*. In the embodiment, a starting point S2 of the first docking external thread 54*a* includes a first docking-thread leading angle A2. Preferably but not exclusively, the first extension-thread leading angle A1 is equal to the first docking-thread leading angle A2. Thereby, the ending point E1 of the first main external thread 41*a* is continuously connected to the starting point S1 of the first extension external thread 51*a*. In the embodiment, the starting point S1' of the second extension external thread 51*b* has a second extension-thread leading angle A1'. The second screw rod 40*b* includes a second front docking screw hole 44*b* disposed on the second extension end 43*b*, and the second docking portion 52*b* includes a second docking external thread 54*b* corresponding to the second front docking screw hole 44*b*. In the embodiment, a starting point S2' of the second docking external thread 54*b* includes a second docking-thread leading angle A2'. Preferably but not exclusively, the second extension-thread leading angle A1' is equal to the second docking-thread leading angle A2'. Thereby, the ending point E1' of the second main external thread 41*b* is continuously connected to the starting point S1' of the second extension external thread 51*b*.

Figure 9A:
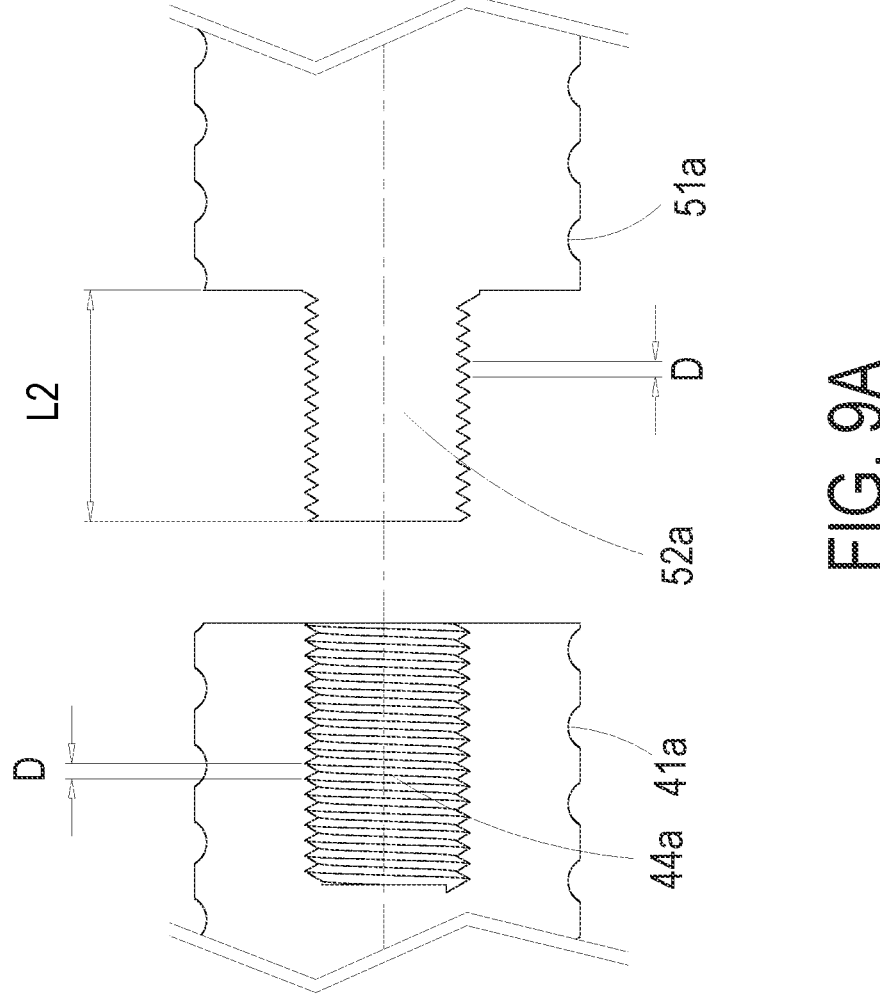
FIGS. 9A and 9B are cross-sectional structural views illustrating another exemplary combination of the screw rod and the extension screw.
Figure 9B:
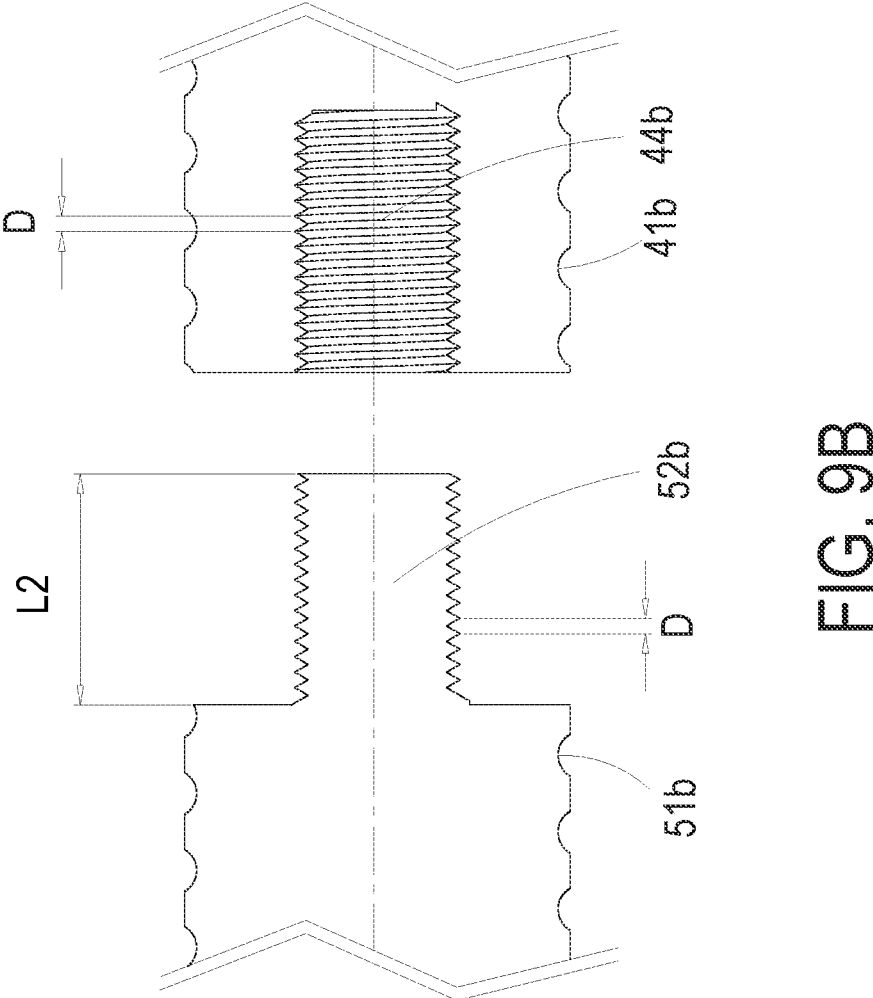
Figure 10A:
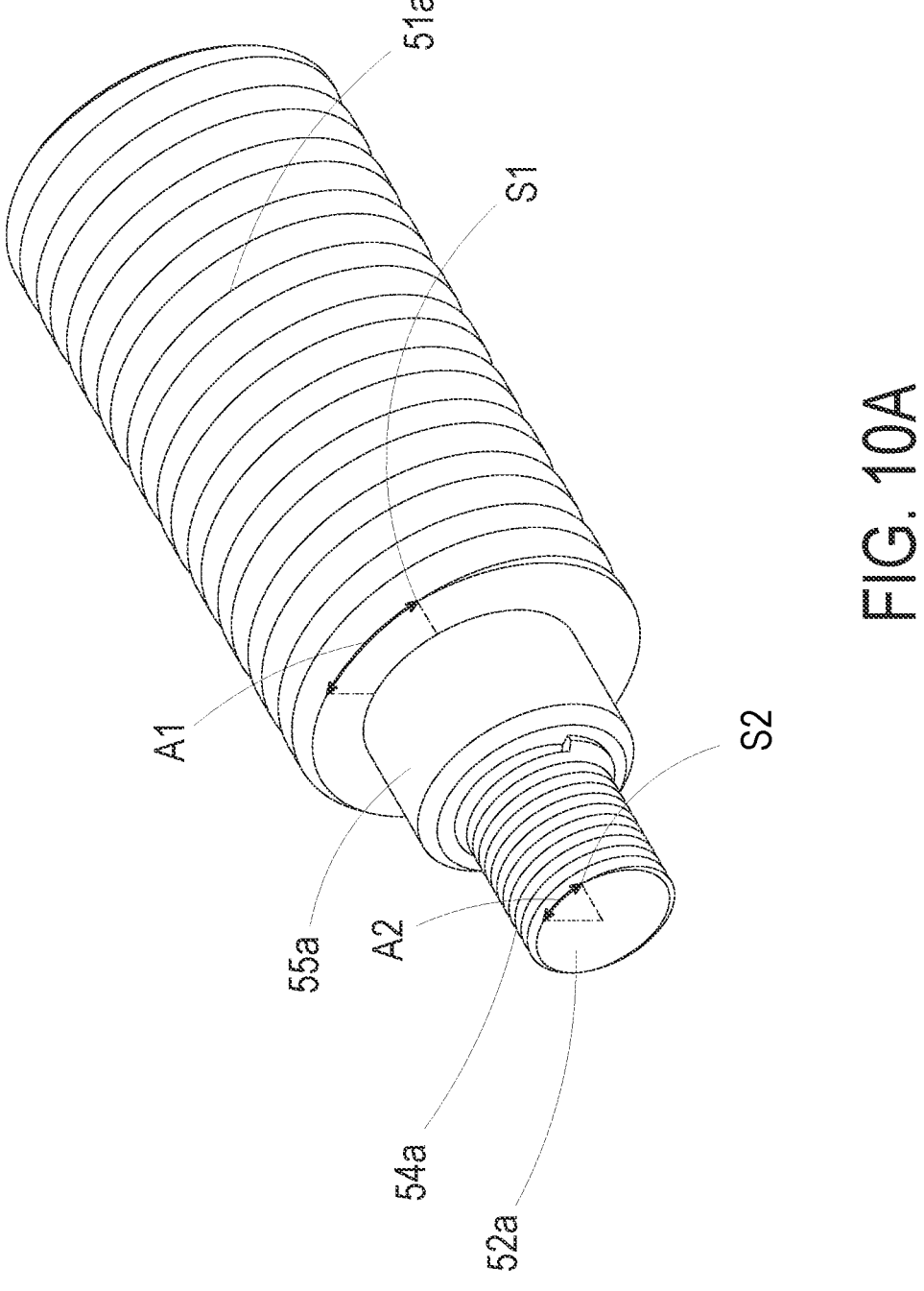
FIGS. 10A and 10B are perspective structural views illustrating the docking portion of the extension screw.
Figure 10B:
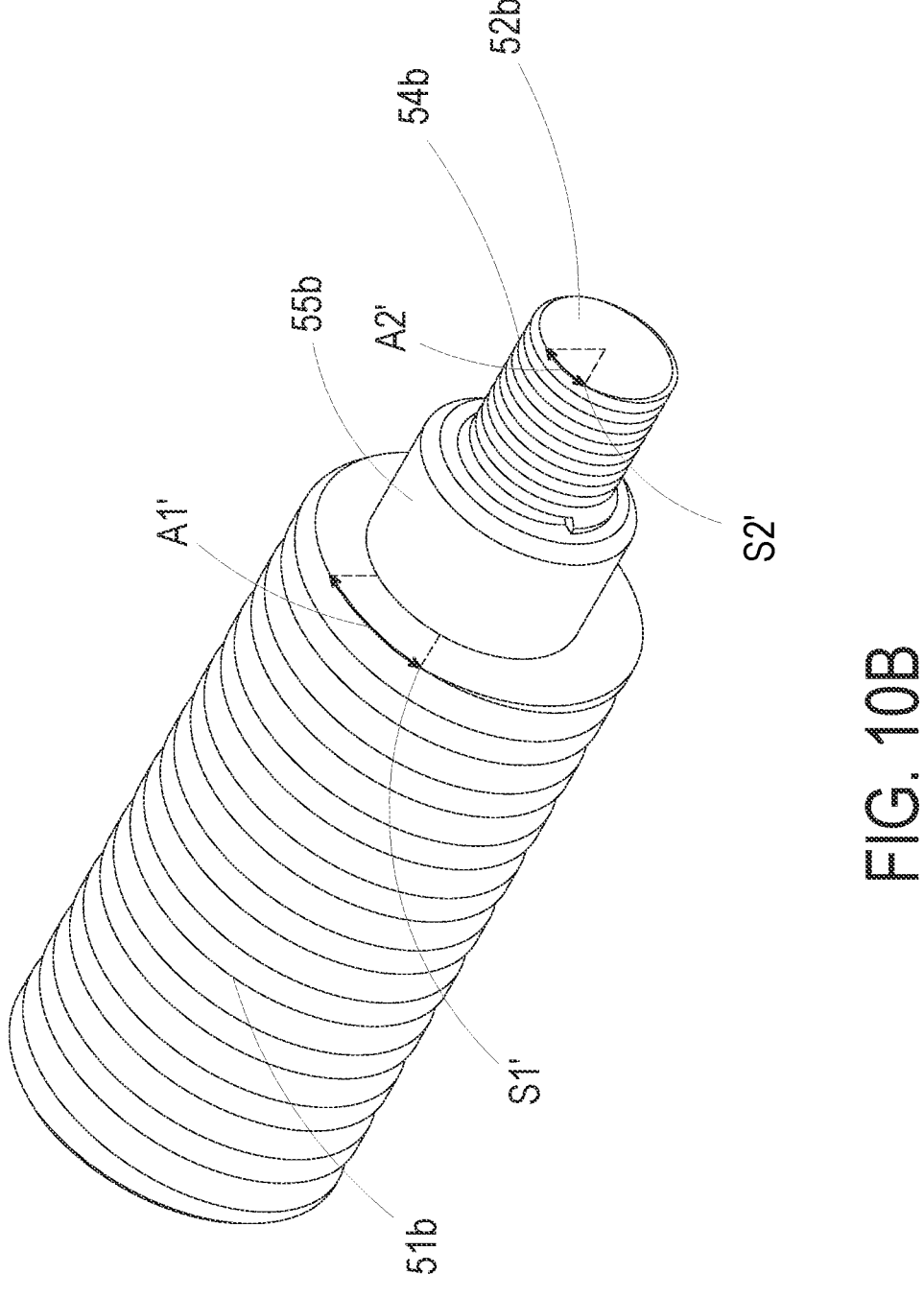
Figure 11A:
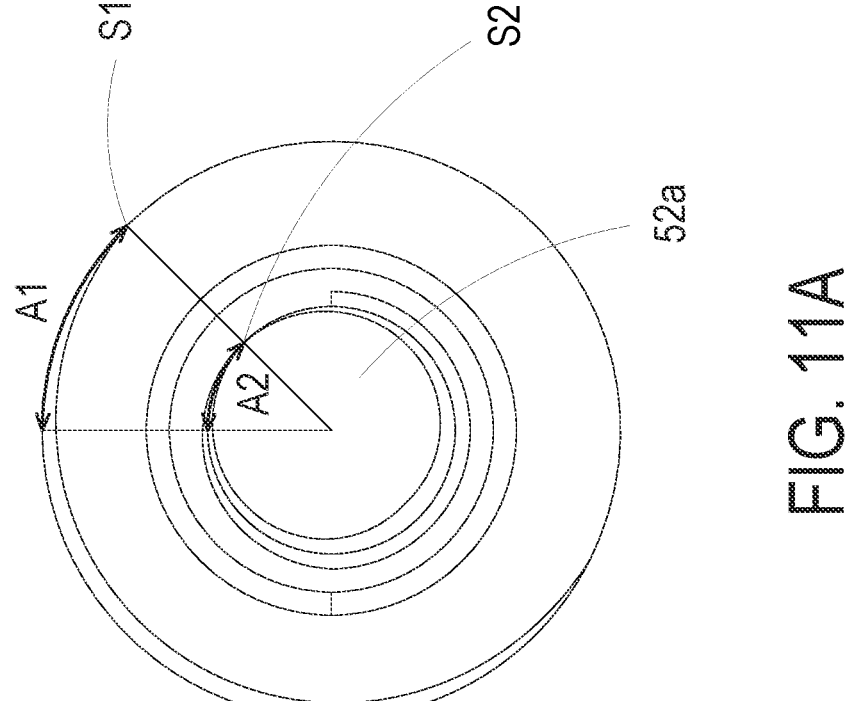
FIGS. 11A and 11B are front views illustrating the docking portion of the extension screw.
Figure 11B:
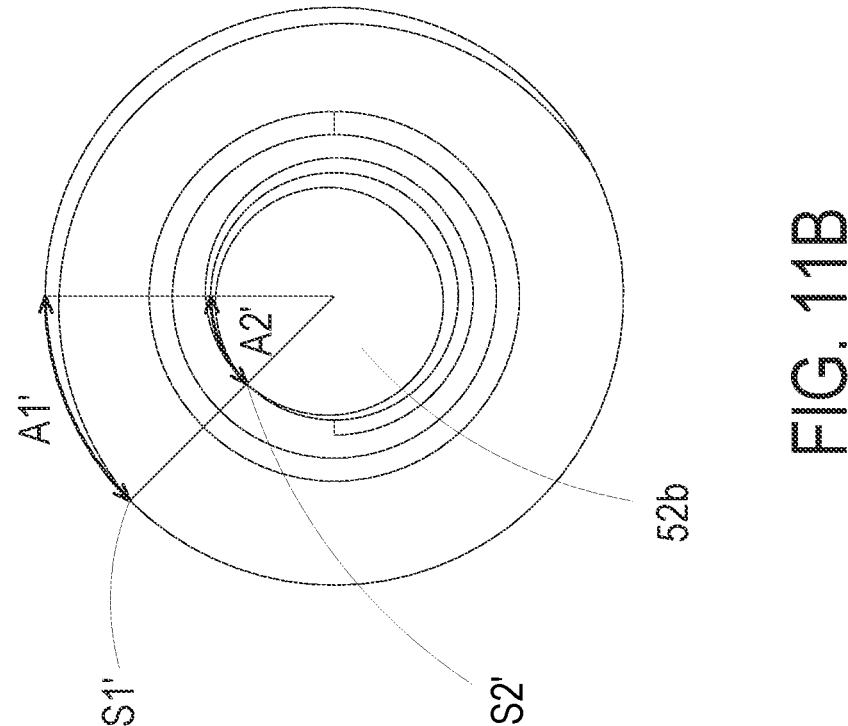
Figure 12A:
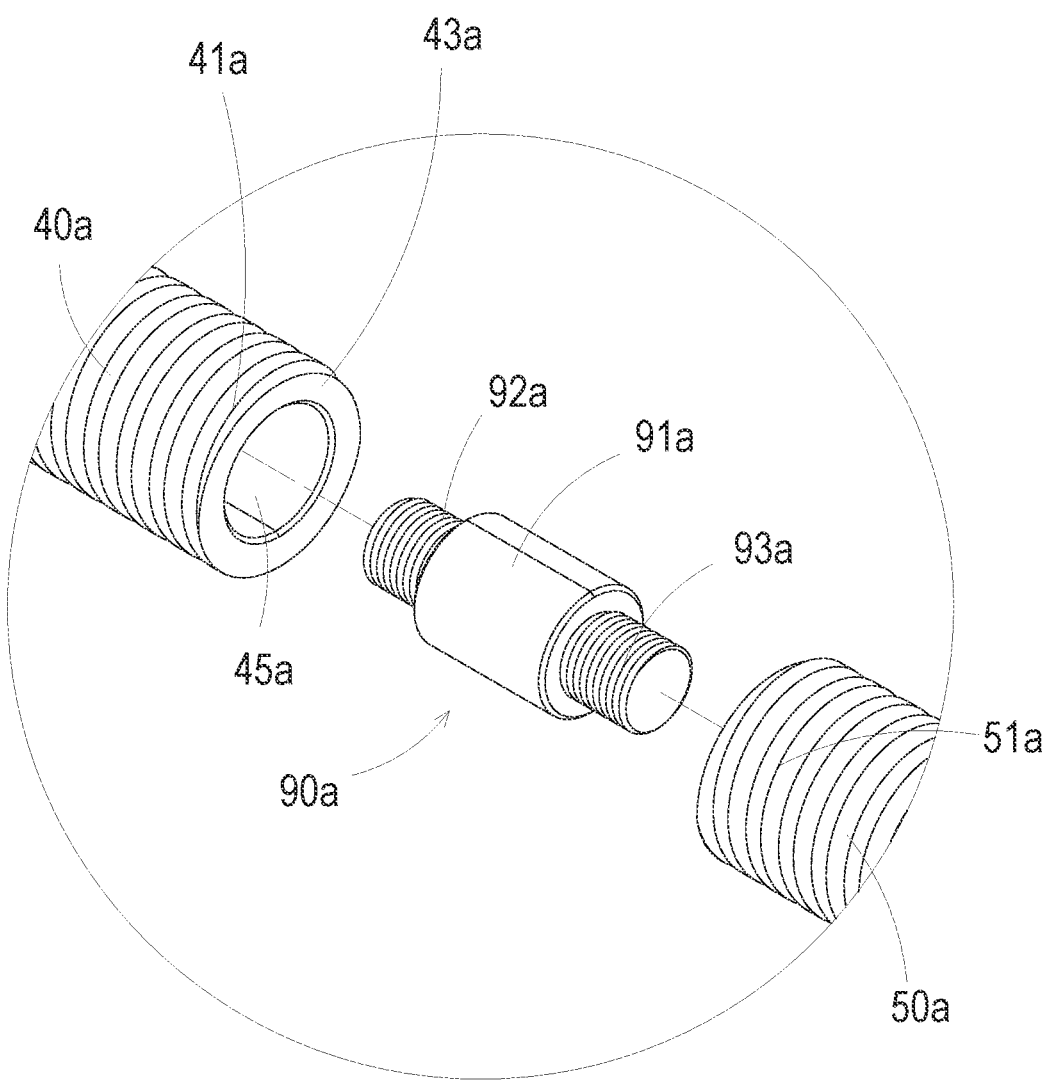
FIGS. 12A and 12B are exploded views illustrating the screw rod and the extension screw docked through an exemplary docking element.
Figure 12B:
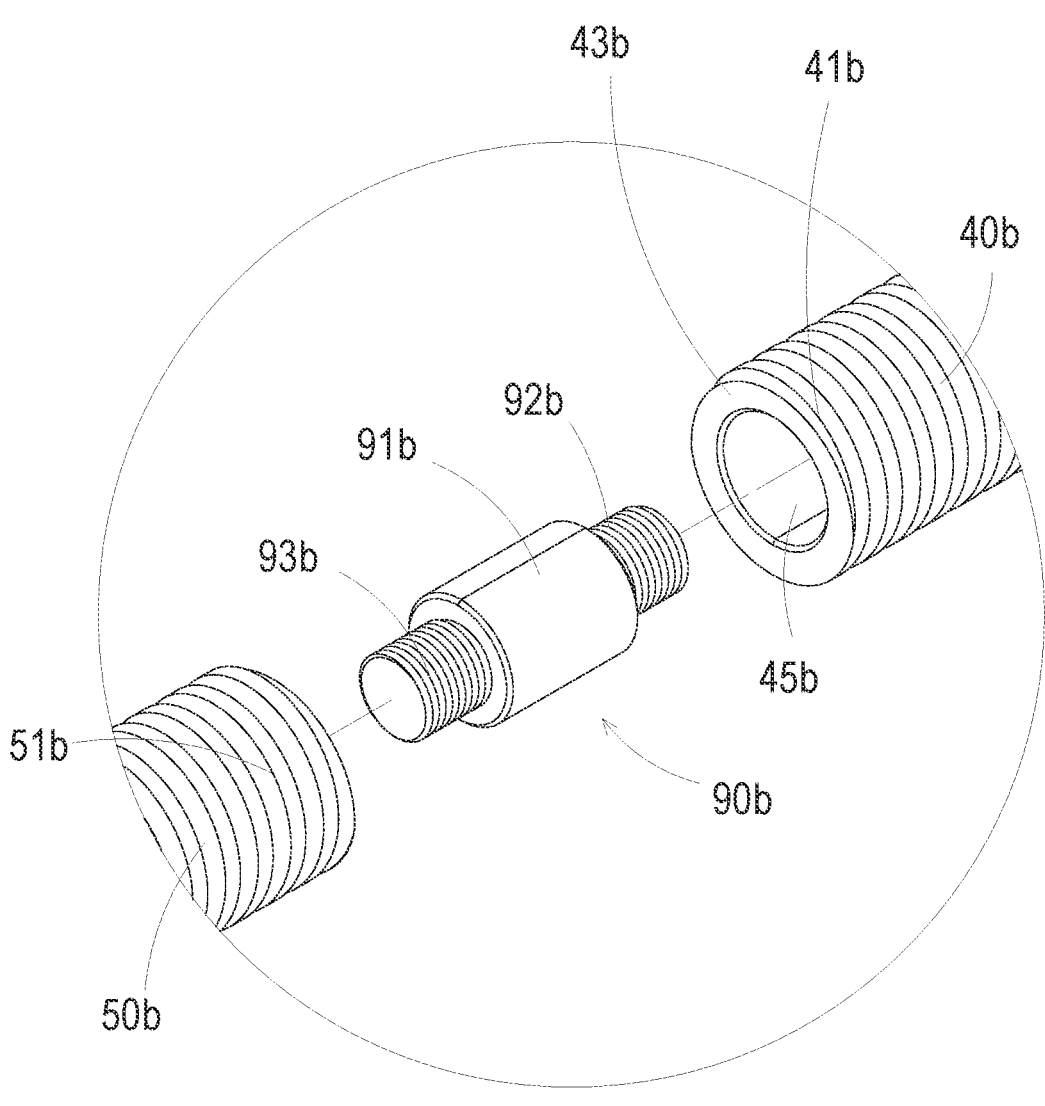
Figure 13A:
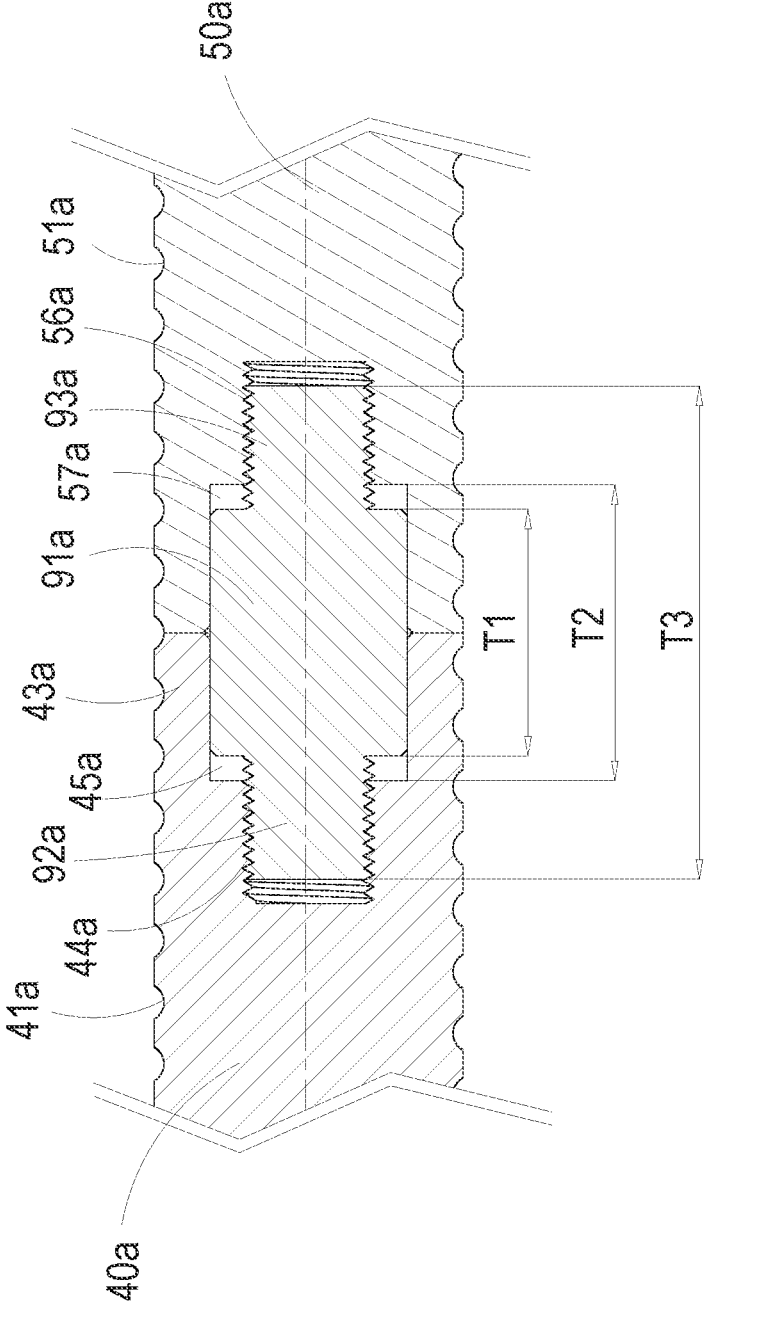
FIGS. 13A and 13B are cross-sectional views illustrating the screw rod and the extension screw docked through an exemplary docking element.
Figure 13B:
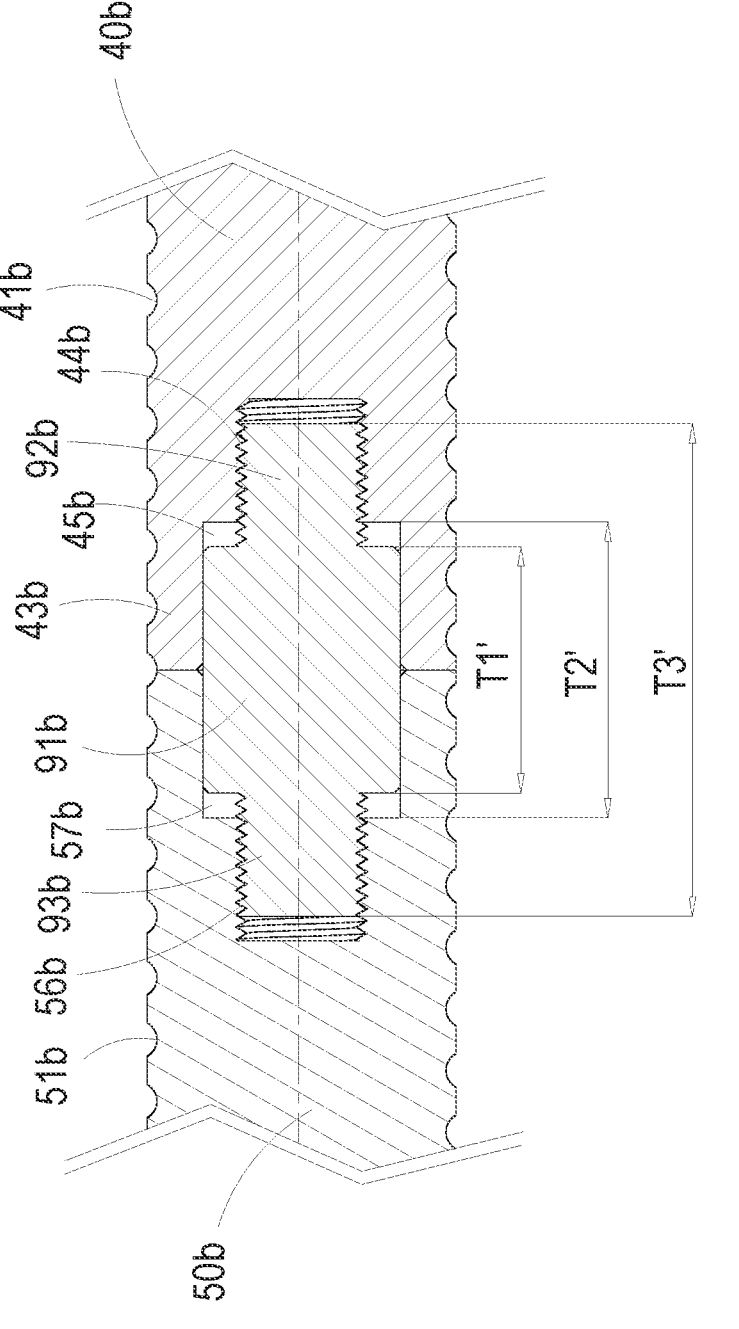
Figure 14A:
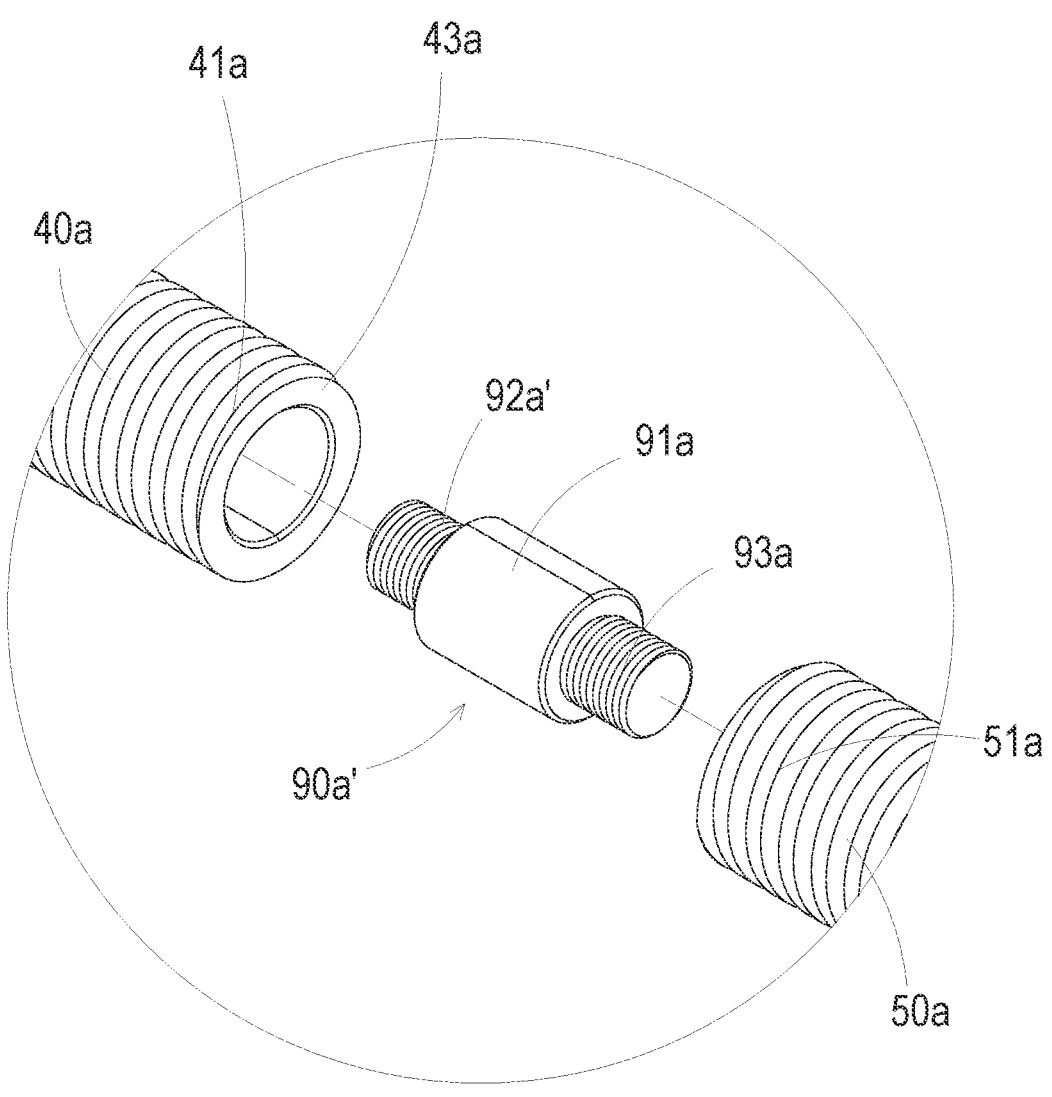
FIGS. 14A and 14B are exploded views illustrating the screw rod and the extension screw docked through another exemplary docking element.
Figure 14B:
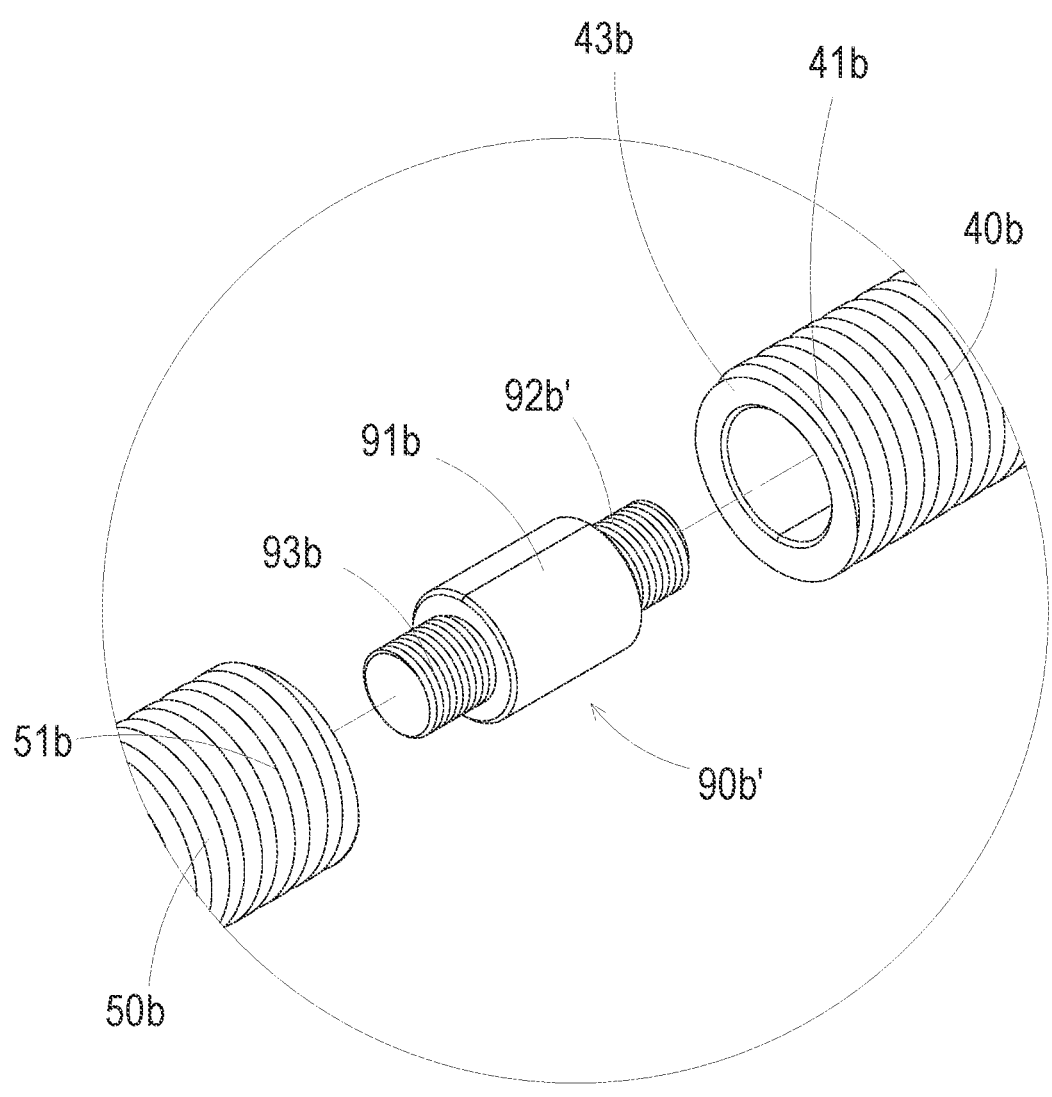
Figure 15A:
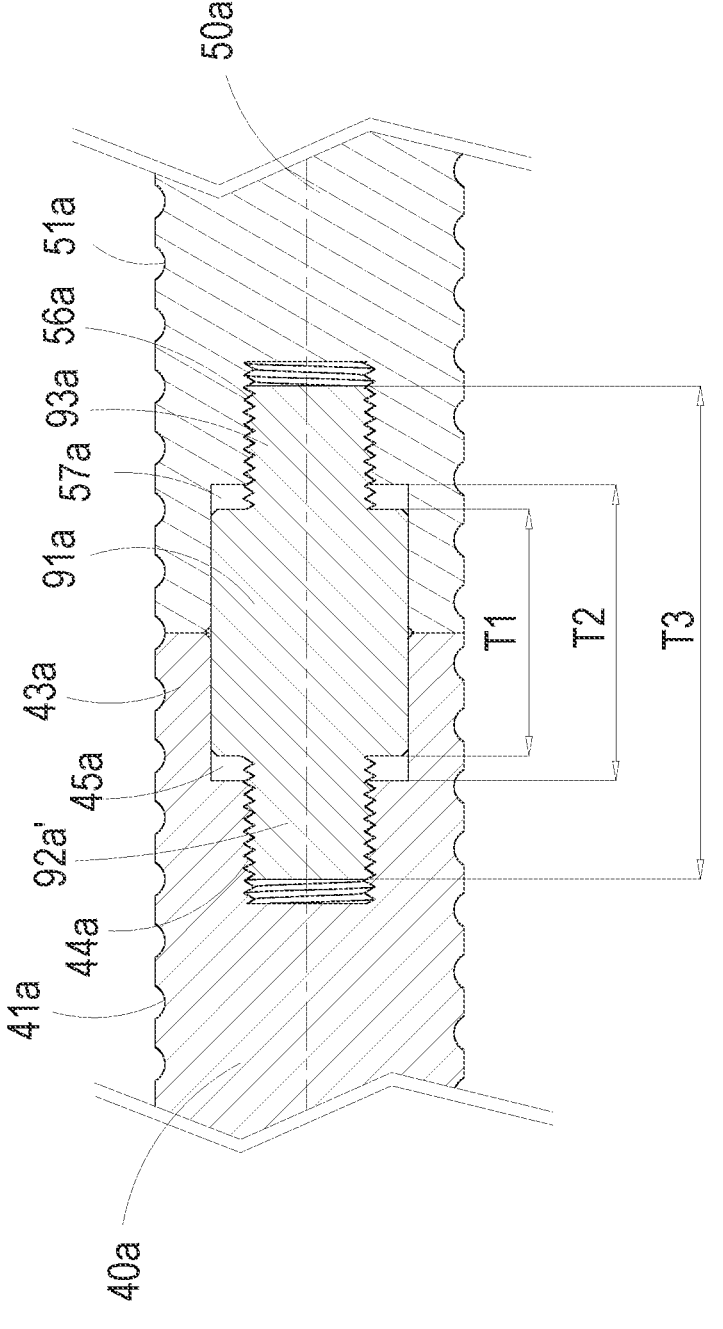
FIGS. 15A and 15B are cross-sectional views illustrating the screw rod and the extension screw docked through another exemplary docking element.
Figure 15B:
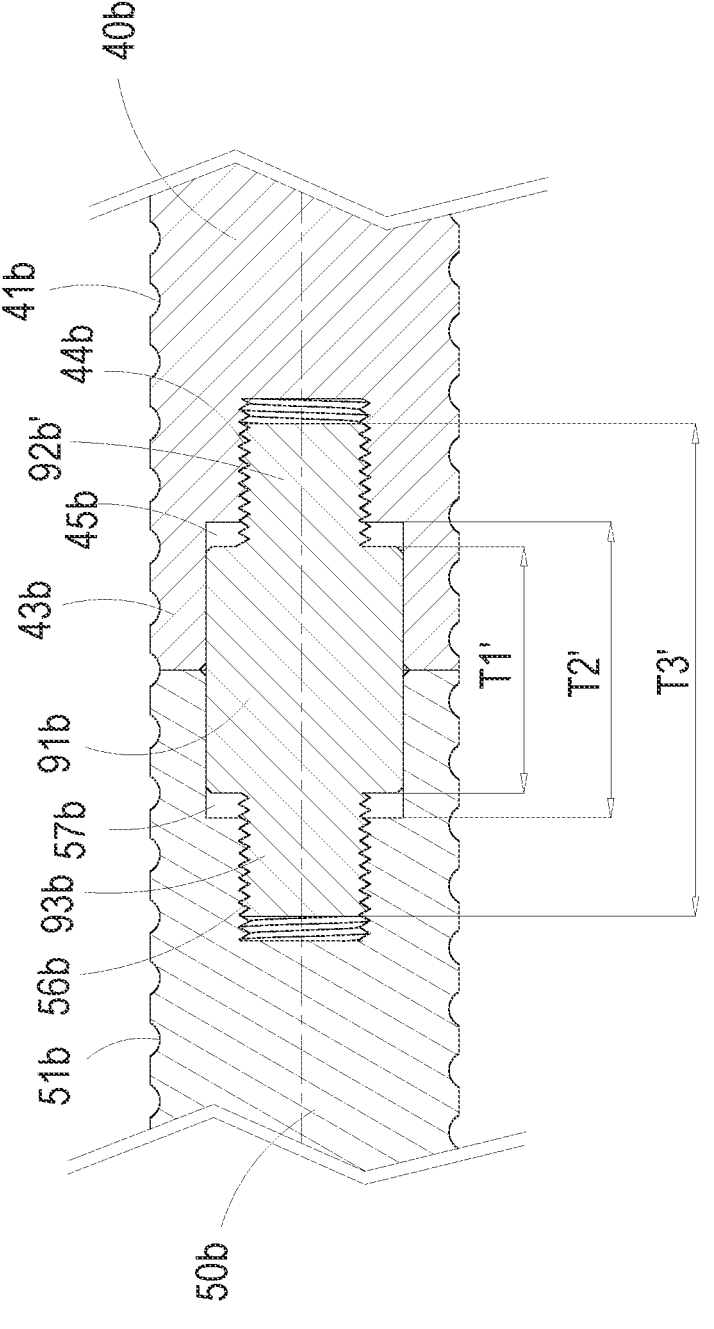

In the embodiment, the first docking portion 52*a* further includes a first positioning section 55*a* arranged between the first docking external thread 54*a* and the first extension external thread 51*a*. The first screw rod 40*a* includes a first front positioning opening 45*a* spatially corresponding to the first positioning section 55*a*. The first front docking screw hole 44*a* is in communication with an exterior through the first front positioning opening 45*a*. With the alignment between the first front positioning opening 45*a* and the first positioning section 55*a*, it helps to improve the combination efficiency of the first extension screw 50*a* and the first screw rod 40*a*. Similarly, in the embodiment, the second docking portion 52*b* further includes a second positioning section 55*b* arranged between the second docking external thread 54*b* and the second extension external thread 51*b*. The second screw rod 40*b* includes a second front positioning opening 45*b* spatially corresponding to the second positioning section 55*b*. The second front docking screw hole 44*b* is in communication with an exterior through the second front positioning opening 45*b*. With the alignment between the second front positioning opening 45*b* and the second positioning section 55*b*, it helps to improve the combination efficiency of the second extension screw 50*b* and the second screw rod 40*b*. In other embodiments, the first positioning section 55*a*, the second positioning section 55*b*, the first front positioning opening 45*a* and the second front positioning opening 45*b* are omitted, as shown in FIG. 9A and FIG. 9B. By designing the docking length L2 of the first docking portion 52*a* of the first extension screw 50*a* and the docking length L2 of the second docking portion 52*b* of the second extension screw 50*b* to be N times the thread pitch D, the ending point E1 of the first main external thread 41*a* is continuously connected to the starting point S1 of the first extension external thread 51*a*, and the ending point E1' of the second main external thread 41*b* is continuously connected to the starting point S1' of the second extension external thread 51*b*

Notably, the combination of the first extension screw 50*a* and the first screw 40*a* and the combination of the second extension screw 50*b* and the second screw rod 40*b* are limited to the above-mentioned way. Please refer to FIG. 3, FIG. 12A to FIG. 15B. In the embodiment, the first screw rod 40*a* and the first extension screw 50*a* are docked through a first docking element 90*a*, and the second screw rod 40*b* and the second extension screw 50*b* are docked through a second docking element 90*b*. In the embodiment, the first screw rod 40*a* includes a first front docking screw hole 44*a* disposed on the first extension end 43*a*. The first extension screw 50*a* includes a first rear docking screw hole 56*a* and a first supporting portion 53*a* (Referring to FIG. 3) disposed on two opposite ends, respectively. Preferably but not exclusively, the first supporting portion 53*a* is pivotally connected to the first extension plate 20*a*, the first front docking screw hole 44*a* and the first rear docking screw hole 56*a* are engaged with two opposite ends of a first docking element 90*a*, respectively, so that the first extension screw 50*a* is docked with the first extension end 43*a* of the first screw rod 40*a*. Moreover, in the embodiment, the second screw rod 40*b* includes a second front docking screw hole 44*b* disposed on the second extension end 43*b*. The second extension screw 50*b* includes a second rear docking screw hole 56*b* and a second supporting portion 53*b* (Referring to FIG. 3) disposed on two opposite ends, respectively. The second supporting portion 53*b* is pivotally connected to the second extension plate 20*b*. The second front docking screw hole 44*b* and the second rear docking screw hole 56*b* are engaged with two opposite ends of a second docking element 90*b*, respectively, so that the second extension screw 50*b* is docked with the second extension end 43*b* of the second screw rod 40*b*.

Figure 7A:
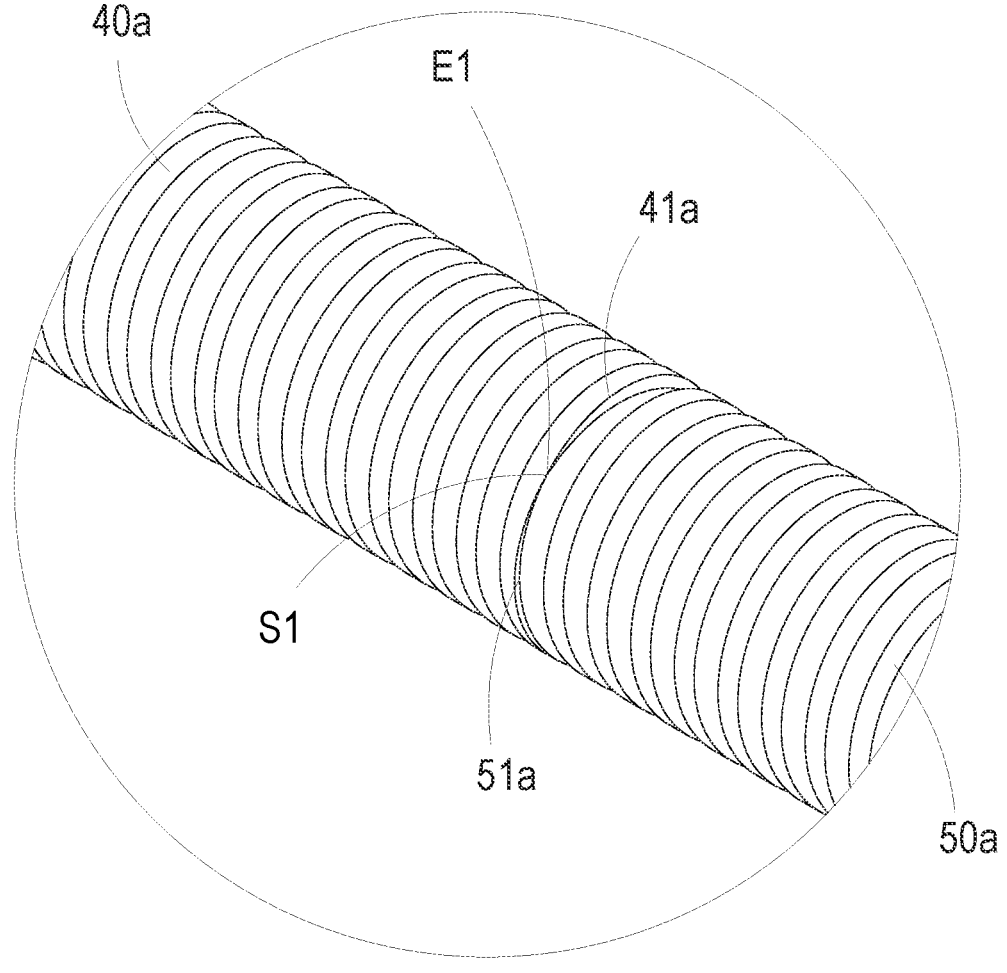
FIGS. 7A and 7B are schematic diagrams showing that the screw rod and the extension screw are assembled with each other.
Figure 7B:
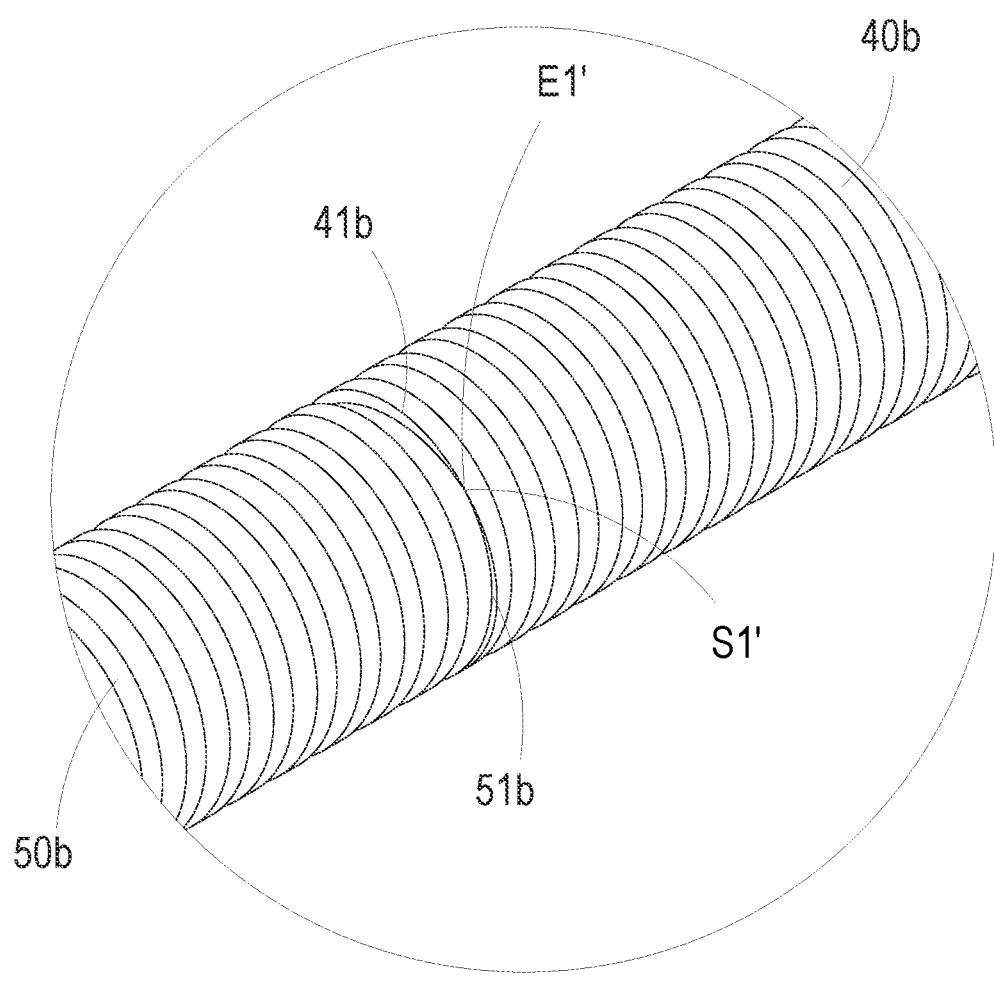
Figure 8A:
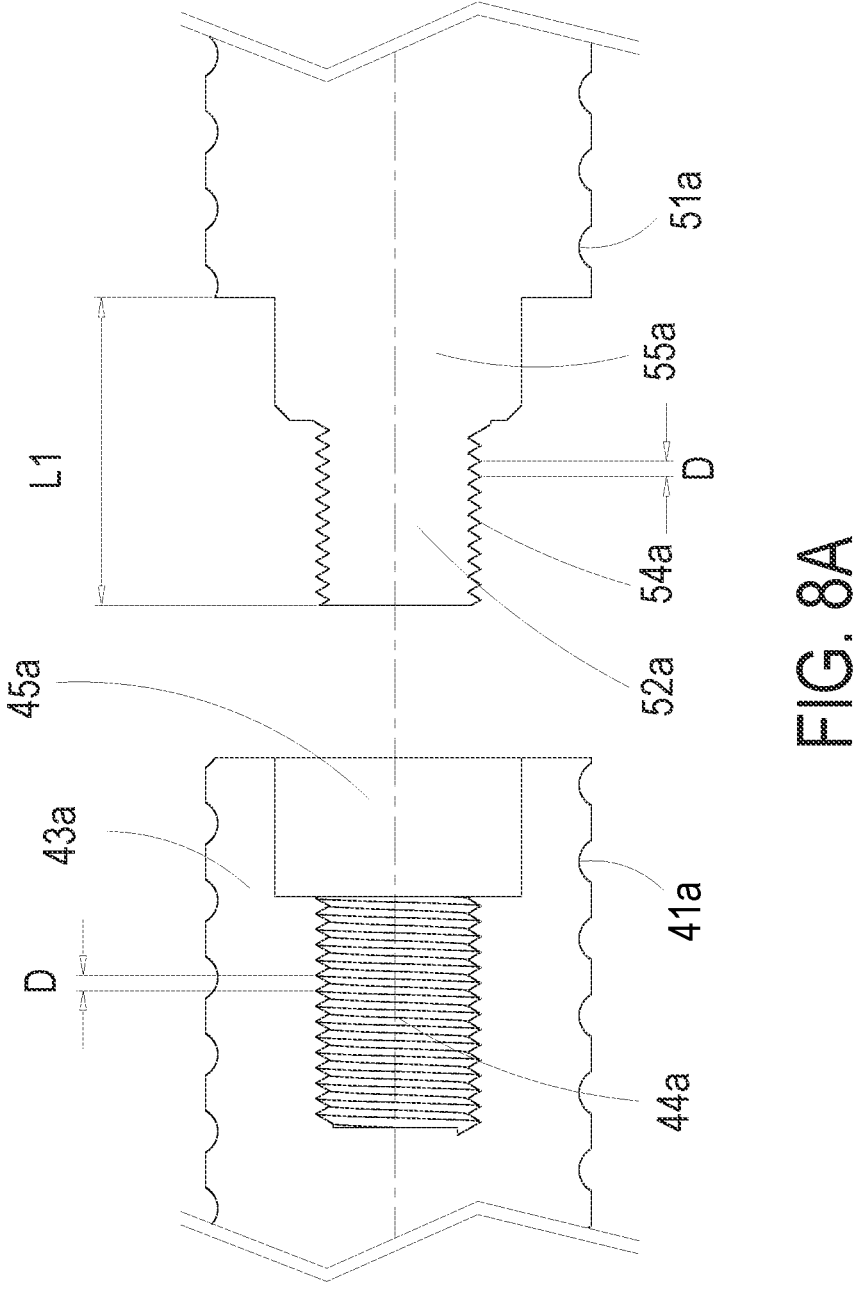
FIGS. 8A and 8B are cross-sectional structural views illustrating an exemplary combination of the screw rod and the extension screw.
Figure 8B:
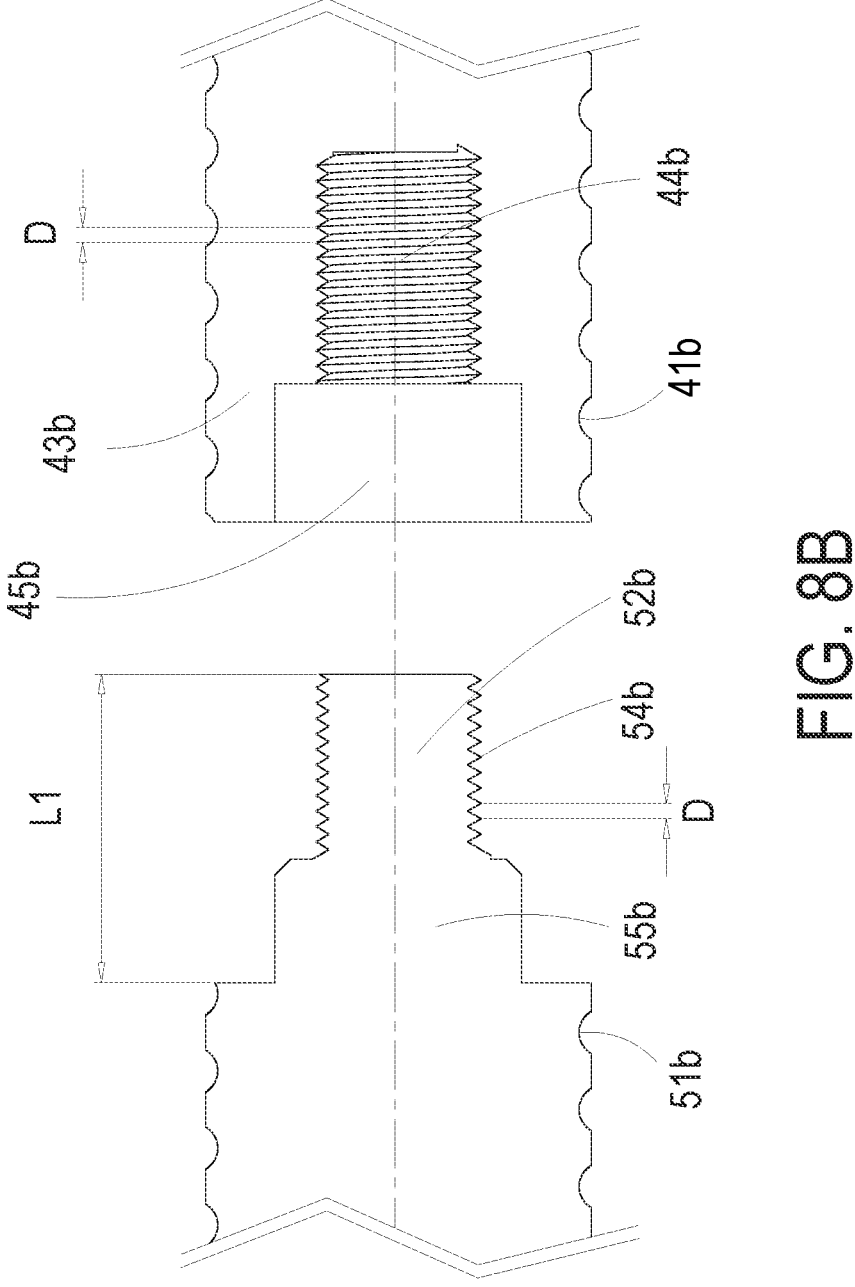

In the embodiment. the first docking element 90*a* includes a first positioning body 91*a*, a first front docking thread 92*a* and a first rear docking thread 93*a*. The first front docking thread 92*a* and the first rear docking thread 93*a* are arranged on two opposite ends of the first positioning body 91*a* and configured to engage with the first front docking screw hole 44*a* and the first rear docking screw hole 56*a*, respectively. Moreover, in the embodiment, the first screw rod 40*a* includes a first front positioning opening 45*a* spatially corresponding to the first positioning body 91*a*. The first front docking screw hole 44*a* is in communication with an exterior through the first front positioning opening 45*a*. The first extension screw 50*a* includes a first rear positioning opening 57*a* spatially corresponding to the first positioning body 91*a*. The first rear docking screw hole 56*a* is in communication with an exterior through the first rear positioning opening 57*a*. In the embodiment, the sum T2 of a length of the first front positioning opening 45*a* and a length of the first rear positioning opening 57*a* is greater than a length T1 of the first positioning body 91*a* and less than a length T3 of the first docking element 90*a*. Thereby, the first docking element 90*a* is accurately connected to the first extension screw 50*a* and the first screw rod 40*a*, to achieve that the ending point E1 of the first main external thread 41*a* is continuously connected to the starting point S1 of the first extension external thread 51*a*, as shown in FIG. 7A. In the embodiment, the second docking element 90*b* includes a second positioning body 91*b*, a second front docking thread 92*b* and a second rear docking thread 93*b*. The second front docking thread 92*b* and the second rear docking thread 93*b* are arranged on two opposite ends of the second positioning body 91*b* and configured to engage with the second front docking screw hole 44*b* and the second rear docking screw hole 56*b*, respectively. Moreover, in the embodiment, the second screw rod 40*b* includes a second front positioning opening 45*b* spatially corresponding to the second positioning body 91*b*. The second front docking screw hole 44*b* is in communication with an exterior through the second front positioning opening 45*b*. The second extension screw 50*b* includes a second rear positioning opening 57*b* spatially corresponding to the second positioning body 91*b*. The second rear docking screw hole 56*b* is in communication with an exterior through the second rear positioning opening 57*b*. In the embodiment, the sum T2' of a length of the second front positioning opening 45*b* and a length of the second rear positioning opening 57*b* is greater than a length T1' of the second positioning body 91*b* and less than a length T3' of the second docking element 90*b*. Thereby, the second docking element 90*b* is accurately connected to the second extension screw 50*b* and the second screw rod 40*b*, to achieve that the ending point E1' of the second main external thread 41*b* is continuously connected to the starting point S1' of the second extension external thread 51*b*, as shown in FIG. 7B.

In the embodiment, a thread-rotation direction of the first front docking thread 92*a* and a thread-rotation direction of the first main external thread 41*a* are identical, but reverse to a thread-rotation direction of the first rear docking thread 93*a*. A thread-rotation direction of the second front docking thread 92*b* and a thread-rotation direction of the second main external thread 41*b* are identical, but reverse to a thread-rotation direction of the second rear docking thread 93*b*. In other embodiments, a thread-rotation direction of the first front docking thread 92*a*' of the first docking element 90*a* is reverse to a tread-rotation direction of the first main external thread 41*a*, and reverse to the first rear docking external thread 93*a*. A thread-rotation direction of the second front docking thread 92*b*' of the second docking element 90*b* is reverse to a tread-rotation direction of the second main external thread 41*b*, and reverse to the second rear docking external thread 93*b*. In other embodiments, the thread-rotation directions of the first docking external thread 54*a*, the second docking external thread 54*b*, the first front docking thread 92*a*, the first rear docking thread 93*a*, the second front docking thread 92*b* and the second rear docking thread 93*b* are adjustable according to the practical requirements. It is not limited to the thread-rotation directions of the first main external thread 41*a* and the second main external thread 41*b*. The present disclosure is not limited thereto and not redundantly described herein.

From the above, the first extension plate 20*a* and the second extension plate 20*b*, the first screw rod 40*a* and the second screw rod 40*b*, the first extension screw 50*a* and the second extension screw 50*b*, the first nut 60*a* and the second nut 60*b*, the first extension rail 71*a* and the second extension rail 71*b* are designed with bilaterally symmetry in pairs, it is conducive to the realization of modularization, and easy to disassemble and adjust to achieve the clamping operation in different strokes. When the stroke length of the gripper needs to be increased, the first extension plate 20*a* and the second extension plate 20*b*, the first extension screw 50*a* and the second extension screw 50*b*, and the first extension rail 71*a* and the second extension rail 71*b* are added on both sides to increase the stroke length. There is no need to redesign the gripper structure. It helpful of increasing the diversity of product applications. Certainly, the lengths and the numbers of the first extension plate 20*a* and the second extension plate 20*b*, the first extension screw 50*a* and the second extension screw 50*b*, and the first extension rail 71*a* and the second extension rail 71*b* added on both sides are adjustable according to the practical requirements. The present disclosure is no limited thereto.

In summary, the present disclosure provides a modular gripper having screw rods, linear rails and fixing plates in modular design, capable of adjusting the length and the working stroke according to the requirements without redesigning the screw rods and the fixing plates. The two opposite ends of the main fixing plate are extended in length through the extension plates. Preferably, the main fixing plate and the extension plates are docked in a parallel fastening method to avoid the vertical stacking and fastening, so that the thickness of the entire plate is not increased. In addition, the two screw rods of the left-handed screw rod and the right-handed screw rod can increase the length through the extension screws. Preferably, the connection between the screw rod and the extension screw adopts a concentric connection along the axial direction, and the threads of each other are continuous. Since the left-handed screw rod and right-handed screw rod are connected to the motor of the drive module through the pulleys in a concentric mounting configuration. When the motor rotates the pulley through the belt, the left-handed screw rod and the right-handed screw rod are driven to rotate simultaneously. In addition, the corresponding nut is allowed to displace within the range of the screw rod and the extension screw. Furthermore, the nuts sleeved on the left-handed screw rod and the right-handed screw rod are connected to the linear rails through the sliding block as an adapter plate, so that the clamping element is smoothly moved left and right synchronously with the nut to achieve the long-stroke clamping operation. Since the screw rods, the extension plates, the extension screws, the nuts, the linear rails and the extension rails are designed with bilateral symmetry, it is conducive to the realization of modularization, and easy to disassemble and adjust to achieve the clamping operation in different strokes. When the stroke length of the gripper needs to be increased, the extension screws, the extension plates and the extension rails are added on both sides to increase the stroke length. There is no need to redesign the gripper structure. It helpful of increasing the diversity of product applications.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A modular gripper comprising:

a main fixing plate having two docking ends opposite to each other in a first direction;

a first extension plate and a second extension plate, bilaterally symmetrical to each other and detachably docked to the two docking ends of the main fixing plate through a first connection component and a second connection component, respectively, in the first direction;

a driving module disposed on the main fixing plate;

a first screw rod and a second screw rod bilaterally symmetrical to each other, disposed on the main fixing plate and arranged concentrically in the first direction, wherein the first screw rod comprises a first driving end and a an extension end, the second screw rod comprises a second driving end and a second extension end, and the first driving end and the second driving end face each other in the first direction and are connected to the driving module, wherein the first extension end and the second extension end are disposed opposite to each other in the first direction;

a first extension screw and a second extension screw bilaterally symmetrical to each other, wherein the first extension screw is detachably connected to the first extension end, and a thread of the first extension screw is continuously connected with a thread of the first screw rod, wherein the second extension screw is detachably connected to the second extension end, and a thread of the second extension screw is continuously connected with a thread of the second screw rod; and a first nut and a second nut bilaterally symmetrical to each other, and sleeved and matched to the first screw rod and the second screw rod respectively, wherein when the first screw rod and the first extension screw are driven by the driving module to rotate synchronously, the first nut is allowed to displace relative to the first screw rod and the first extension screw in the first direction, wherein when the second screw rod and the second extension screw are driven by the driving module to rotate synchronously, the second nut is allowed to displace relative to the second screw rod and the second extension screw in the first direction, thereby the first nut and the second nut are close to or far away from each other to achieve a clamping operation.

2. The modular gripper according to claim 1, wherein each of the first connection component and the second connection component comprises a first fastening element, a second fastening element and a restricting element, the first fastening element and the second fastening element are arranged concentrically, an operation end of the first fastening element and an operation end of the second fastening element face each other, and the restricting element is disposed between the first fastening element and the second element and configured to restrict an axial direction between the first fastening element and the second fastening element.

3. The modular gripper according to claim 2, wherein when the main fixing plate is docked with the first extension plate and the second extension plate, respectively, a window is formed therebetween, and the operation end of the first fastening element and the operation end of the second fastening element are exposed through the window.

4. The modular gripper according to claim 2, wherein the first fastening element and the second fastening element are two screws with the same thread-rotation direction or two screws with reverse thread-rotation directions.

5. The modular gripper according to claim 1, wherein the first connection component and the second connection component do not exceed an overlapping range of the first extension plate, the main fixing plate and the second extension plate along the first direction in a viewing direction of the first direction.

6. The modular gripper according to claim 1, wherein the first screw rod comprises a first main external thread, the second screw rod comprises a second main external thread, and a rotation direction of the first main external thread and a rotation direction of the second main external thread are reverse, wherein the first extension screw comprises a first extension external thread, the second extension screw comprises a second extension external thread, and a rotation direction of the first extension external thread and a rotation direction of the second extension external thread are reverse.

7. The modular gripper according to claim 6, wherein an ending point of the first main external thread is continuously connected with a starting point of the first extension external thread, and an ending point of the second main external thread is continuously connected with a starting point of the second extension external thread.

8. The modular gripper according to claim 7, wherein the first extension screw comprises a first docking portion and a first supporting portion, the first docking portion is detachably connected to the first extension end, and the first supporting portion is pivotally connected to the first extension plate, wherein the second extension screw comprises a second docking portion and a second supporting portion, the second docking portion is detachably connected to the second extension end, and the second supporting portion is pivotally connected to the second extension plate.

9. The modular gripper according to claim 8, wherein the first screw rod comprises a first front docking screw hole, the second screw rod comprises a second front docking screw hole, the first docking portion comprises a first docking external thread, the second docking portion comprises a second docking external thread, and the first front docking screw hole, the second front docking screw hole, the first docking external thread and the second docking external thread have an identical thread pitch, wherein the first docking portion and the second docking portion have a docking length, respectively, the docking length is N times the thread pitch, N is an integer, and N≥1.

10. The modular gripper according to claim 8, wherein the starting point of the first extension external thread has a first extension-thread leading angle, the first screw rod comprises a first front docking screw hole disposed on the first extension end, the first docking portion comprises a first docking external thread corresponding to the first front docking screw hole, wherein a starting point of the first docking external thread comprises a first docking-thread leading angle, and the first extension-thread leading angle is equal to the first docking-thread leading angle, wherein the starting point of the second extension external thread has a second extension-thread leading angle, the second screw rod comprises a second front docking screw hole disposed on the second extension end, the second docking portion comprises a second docking external thread corresponding to the second front docking screw hole, wherein a starting point of the second docking external thread comprises a second docking-thread leading angle, and the second extension-thread leading angle is equal to the second docking-thread leading angle.

11. The modular gripper according to claim 10, wherein the first docking portion further comprises a first positioning section arranged between the first docking external thread and the first extension external thread, the first screw rod comprises a first front positioning opening spatially corresponding to the first positioning section, and the first front docking screw hole is in communication with an exterior through the first front positioning opening, wherein the second docking portion further comprises a second positioning section arranged between the second docking external thread and the second extension external thread, the second screw rod comprises a second front positioning opening spatially corresponding to the second positioning section, and the second front docking screw hole is in communication with an exterior through the second front positioning opening.

12. The modular gripper according to claim 7, wherein the first screw rod comprises a first front docking screw hole disposed on the first extension end, the first extension screw comprises a first rear docking screw hole and a first supporting portion disposed on two opposite ends, respectively, the first supporting portion is pivotally connected to the first extension plate, the first front docking screw hole and the first rear docking screw hole are engaged with two opposite ends of a first docking element, respectively, so that the first extension screw is docked with the first extension end of the first screw rod, wherein the second screw rod comprises a second front docking screw hole disposed on the second extension end, the second extension screw comprises a second rear docking screw hole and a second supporting portion disposed on two opposite ends, respectively, the second supporting portion is pivotally connected to the second extension plate, the second front docking screw hole and the second rear docking screw hole are engaged with two opposite ends of a second docking element, respectively, so that the second extension screw is docked with the second extension end of the second screw rod.

13. The modular gripper according to claim 12, wherein the first docking element comprises a first positioning body, a first front docking thread and a first rear docking thread, and the first front docking thread and the first rear docking thread are arranged on two opposite ends of the first positioning body and configured to engage with the first front docking screw hole and the first rear docking screw hole, respectively, wherein the first screw rod comprises a first front positioning opening spatially corresponding to the first positioning body, the first front docking screw hole is in communication with an exterior through the first front positioning opening, the first extension screw comprises a first rear positioning opening spatially corresponding to the first positioning body, and the first rear docking screw hole is in communication with an exterior through the first rear positioning opening, wherein the second docking element comprises a second positioning body, a second front docking thread and a second rear docking thread, and the second front docking thread and the second rear docking thread are arranged on two opposite ends of the second positioning body and configured to engage with the second front docking screw hole and the second rear docking screw hole, respectively, wherein the second screw rod comprises a second front positioning opening spatially corresponding to the second positioning body, the second front docking screw hole is in communication with an exterior through the second front positioning opening, the second extension screw comprises a second rear positioning opening spatially corresponding to the second positioning body, and the second rear docking screw hole is in communication with an exterior through the second rear positioning opening.

14. The modular gripper according to claim 13, wherein the sum of a length of the first front positioning opening and a length of the first rear positioning opening is greater than a length of the first positioning body and less than a length of the first docking element, wherein the sum of a length of the second front positioning opening and a length of the second rear positioning opening is greater than a length of the second positioning body and less than a length of the second docking element.

15. The modular gripper according to claim 13, wherein a thread-rotation direction of the first front docking thread and a thread-rotation direction of the first rear docking thread are identical, wherein a thread-rotation direction of the second front docking thread and a thread-rotation direction of the second rear docking thread are identical.

16. The modular gripper according to claim 13, wherein a thread-rotation direction of the first front docking thread and a thread-rotation direction of the first rear docking thread are reverse, wherein a thread-rotation direction of the second front docking thread and a thread-rotation direction of the second rear docking thread are reverse.

17. The modular gripper according to claim 1, wherein the driving module comprises a motor, a belt and a pulley, the pulley is connected to the first driving end of the first screw rod and the second driving end of the second screw rod, and the motor is disposed on the main fixing plate and connected to the pulley through the belt for driving the pulley, so that the first screw rod and the second screw rod are driven to rotate concentrically.

18. The modular gripper according to claim 1, further comprising a linear rail, a first extension rail, a second extension rail, a first sliding block and a second sliding block, wherein the linear rail is disposed on the main fixing plate along the first direction and spatially corresponding to the first screw rod and the second screw rod, wherein the first extension rail and the second extension rail are bilaterally symmetrical to each other, disposed on the first extension plate and the second extension plate, respectively, and connected to two opposite ends of the linear rail, wherein the first sliding block is connected to the first nut, and the first sliding block and the first nut are allowed to synchronously displace relative to the linear rail and the first extension rail in the first direction, wherein the second sliding block is connected to the second nut, and the second sliding block and the second nut are allowed to synchronously displace relative to the linear rail and the second extension rail in the first direction.

19. The modular gripper according to claim 18, further comprising a first clamping element and a second clamping element fixed to the first sliding block and the second sliding block, respectively, wherein when the driving module drives the first screw rod, the first extension screw, the second crew rod and the second extension screw to rotate, the first nut, the first sliding block and the first clamping element are driven to approach or move away from the second nut, the second sliding block and the second clamping element to achieve the clamping operation.

* * * * *